United States Patent
Lo

(10) Patent No.: US 11,842,083 B2
(45) Date of Patent: Dec. 12, 2023

(54) STORAGE SYSTEM ARCHITECTURE WITH DUAL STORAGE VIRTUALIZATION CONTROLLERS AND THE DATA ACCESS METHOD THEREOF

(71) Applicant: Infortrend Technology, Inc., New Taipei (TW)

(72) Inventor: Yun-Jian Lo, New Taipei (TW)

(73) Assignee: Infortrend Technology, Inc., New Taipei (TW)

( * ) Notice: Subject to any disclaimer, the term of this patent is extended or adjusted under 35 U.S.C. 154(b) by 0 days.

(21) Appl. No.: 17/584,360

(22) Filed: Jan. 25, 2022

(65) Prior Publication Data

US 2023/0034049 A1 Feb. 2, 2023

Related U.S. Application Data

(60) Provisional application No. 63/144,992, filed on Feb. 3, 2021.

(51) Int. Cl.
*G06F 3/06* (2006.01)
*G06F 12/02* (2006.01)

(52) U.S. Cl.
CPC ............ *G06F 3/0665* (2013.01); *G06F 3/061* (2013.01); *G06F 3/0683* (2013.01); *G06F 12/0284* (2013.01); *G06F 2212/1016* (2013.01); *G06F 2212/152* (2013.01)

(58) Field of Classification Search
CPC ............ G06F 11/2038; G06F 11/2046; G06F 12/0284; G06F 2201/815; G06F 2212/1016; G06F 2212/152; G06F 3/061; G06F 3/0635; G06F 3/0659; G06F 3/0665; G06F 3/067; G06F 3/0683
See application file for complete search history.

(56) References Cited

U.S. PATENT DOCUMENTS 10,911,225 B2 * 2/2021 Bunch ................. G06F 21/6218
2013/0054846 A1 2/2013 Chaurasia
2014/0040410 A1 2/2014 McDowell
(Continued)

FOREIGN PATENT DOCUMENTS

CN 101582915 A 11/2009
CN 101788890 A 7/2010
(Continued)

*Primary Examiner* — Yong J Choe
(74) *Attorney, Agent, or Firm* — Winston Hsu

(57) ABSTRACT

In a storage system architecture having two storage virtualization controllers (SVCs) that operate in an active-active mode, the corresponding relationships between storage addresses in the two buffers of the two SVCs are predetermined. When a non-owner SVC that does not have an ownership over a logical disk (LD), receives an I/O request from a host, the non-owner SVC will inquire of the other SVC having the ownership, about associated address information, and then the non-owner SVC that does not have the ownership over the LD will perform, according to the associated address information, the I/O request from the host. Therefore, data synchronization operation for mutually backing up data between the two SVCs can be fast achieved. Also, it allows the host to issue a data access request to any one of the SVCs, thus improving performance of the storage system.

41 Claims, 22 Drawing Sheets

(56) References Cited

U.S. PATENT DOCUMENTS

2018/0300064 A1 10/2018 McGlaughlin
2021/0026653 A1 1/2021 Burriss

FOREIGN PATENT DOCUMENTS

| CN | 104049909 A | 9/2014 |
|----|-------------|--------|
| CN | 107430567 A | 12/2017 |
| CN | 109213702 A | 1/2019 |
| CN | 109815170 A | 5/2019 |
| CN | 111373362 A | 7/2020 |
| EP | 1 796 003 A2 | 6/2007 |
| TW | 200625099 A | 7/2006 |
| TW | 202031021 A | 8/2020 |

* cited by examiner

STORAGE SYSTEM ARCHITECTURE WITH DUAL STORAGE VIRTUALIZATION CONTROLLERS AND THE DATA ACCESS METHOD THEREOF

CROSS REFERENCE TO RELATED APPLICATION

This application claims the benefit of U.S. Provisional Application No. 63/144,992, filed on Feb. 3, 2021. The content of the application is incorporated herein by reference.

BACKGROUND OF THE INVENTION

1. Field of the Invention

The present invention relates to a data storage system architecture and the data access method thereof, and more particularly, to a data storage system architecture with dual storage virtualization controllers and the data access method thereof.

2. Description of the Prior Art

Storage virtualization is a technology that has been used to virtualize physical storage space; that is, storage virtualization technology can combine different sections of physical storage devices (PSDs) into logical disks (LDs) or also called logical media units (LMUs) that are made accessible by a host entity. This storage virtualization technology is primarily used in storage virtualization of Redundant Array of Independent Disks (RAID), which combines smaller physical storage devices into larger, fault-tolerant, higher performance LDs or LMUs.

The primary purpose of a storage virtualization controller (SVC) is to achieve the aforesaid functions, which establishes a mapping relationship between the host entity and the LDs, so that the LDs are made accessible by the host entity. Herein, the LDs are managed by the SVC; in other words, the SVC has an ownership over the LDs. When the SVC receives an input/output (I/O) request from the host entity, the SVC will first parse and interpret the message (for example, the information about which one or more sections of some LD the target data associated with the I/O request will be stored to), and the SVC will translate the I/O request into associated operations and data that are associated with the PSDs.

In order to increase reliability of the data storage system, redundant architecture is often utilized, which configures two SVCs (for example, the first SVC and the second SVC) into a redundant pair or called "SVC pair", so that when one (for example, the first SVC) of the SVC pair malfunctions or breaks down, the other SVC (for example, the second SVC) will take over the work performed by the failed SVC, for example, taking over the LDs originally managed by the failed SVC, such that the host entity may continuously perform access operations on all LDs.

On the device-side of the redundant storage virtualization system, each SVC in the SVC pair must have the connections to all of the PSDs for accessing the PSDs, regardless of whether the PSDs are originally assigned and managed by the SVCs. On the host-side of the redundant storage virtualization system, each SVC in the SVC pair should have capabilities of making all available resources visible and accessible to the host entity under such a situation where the mate SVC is not on-line or is on-line first and then off-line due to some reasons (for example, malfunction, failure, or maintenance); these available resources includes the resources which are originally managed by the other SVC.

Another basic requirement of the redundant storage virtualization system is that each of the SVCs needs to monitor the statuses of each other. Such a monitor of each other can be achieved by an inter-controller communications channel (ICC) between the two SVCs, which is used to exchange the operating statuses of the two SVCs. This ICC can be dedicated, the only function of which is for the two SVCs to exchange parameters and data related to the operation of the redundant storage virtualization system, or such an ICC can be achieved by one or more I/O device interconnects on the host-side or on the device-side, through which, these operating parameters and data exchange may be transmitted in a multiplex manner along with the data that are associated with I/O requests on the interconnects between the host entity and the SVCs, or along with the data that are associated with I/O requests on the interconnects between the PSDs and the SVCs.

When a host entity issues an access request to one (for example, the second SVC) of the SVC pair, and the SVC (for example, the second SVC) that receives the access request from the host entity, finds that actually, the host entity intends to access the LDs managed by the other SVC (for example, the first SVC), the conventional method is that the second SVC will deny the access request from the host entity, so that the host entity must re-issue the access request to the other SVC (for example, the first SVC), thus worsening the access performance of the host entity.

In addition, when a host entity issues a write request to one (for example, the first SVC) of the SVC pair in order to write data into one of the LDs managed by the first SVC, after the first SVC receives the written data and stores the written data into a buffer of its memory, the first SVC will notify the host entity of an acknowledgement signal (for example, an ACK signal) that the write request has been successfully executed; however, there exists a risk in this conventional method. For example, if the first SVC receives a set of written data from the host entity and replies an ACK signal (notifying completion of the write request) to the host entity, but has not yet replicated the written data into the other SVC (for example, the second SVC) of the SVC pair, and the first SVC, however, malfunctions and breaks down, it will result in losing the written data from the host entity. Therefore, even though the second SVC immediately takes over the identity of the first SVC and manages the LDs originally managed by the first SVC after the first SVC malfunctions or breaks down, the fact that the written data from the host entity have been lost, cannot be remedied, which will reduce the reliability of the data storage system. In order to increase the reliability of the data storage system to save the data issued by the host entity, a conventional method is that one (for example, the first SVC) of the SVC pair will replicate the written data into the other SVC (for example, the second SVC) after the first SVC receives the written data from the host entity. Then the first SVC will issue an acknowledge signal (for example, an ACK signal) to inform the host entity of "completion of the write operation". However, there remains a risk in such a conventional method. For example, in case the first SVC is receiving the written data from the host entity or is replicating the written data into the second SVC when it has received the written data, the first SVC suddenly malfunctions during the procedure, which will also cause the loss of the written data because the second SVC cannot have the written data from the first SVC. To solve this problem, the conventional technology utilizes a method that the host entity will issue an inquiry signal to the first SVC for a certain times (for example, twice) in order to detect the current status of the first SVC if the host entity does not receive an acknowledgement signal (for example, an ACK signal) within a certain period of time. On the other hand, if the host entity has not received the acknowledgement signal from the first SVC, the host entity realizes that the first SVC cannot provide service, and the previous write request issued by the host entity has not been completed; therefore, the host entity will re-issue the original write request to the second SVC. Through the aforesaid complicated procedures, although the reliability of the data storage system is increased, it pays the price of lower access performance. Therefore, how to provide a high reliable and high efficient data storage system architecture and data access thereof is an urgent problem to be solved in the storage industry.

SUMMARY OF THE INVENTION

In light of the above problems, it is the object of the present invention to provide a method accessing data in a data storage system architecture (1) comprising a first storage virtualization controller (first SVC, SVC 1) (10), a second storage virtualization controller (second SVC, SVC 2) (20), and a storage pool (4), where the first SVC (SVC 1) (10) comprises a first central processing circuitry (first CPC, CPC 1) (105) and a first memory (memory 1) (107), and the second SVC (SVC 2) (20) comprises a second central processing circuitry (second CPC, CPC 2) (205) and a second memory (memory 2) (207), in which the first CPC (CPC 1) (105) is coupled to the second CPC (CPC 2) (205) through a transmission interface, and the first memory (memory 1) (107) comprises a plurality of first storage spaces, and the second memory (memory 2) (207) comprises a plurality of second storage spaces, the method comprising steps of: managing, by the first SVC (SVC 1) (10), a first logical drive (first LD, LD 1) (12) in the storage pool (4); receiving, by the second SVC (SVC 2) (20), a write request from a host (15), where the write request intends to write a set of written data to the first LD (LD 1) (12); inquiring, by the second SVC (SVC 2) (20), of the first SVC (SVC 1) (10) about address information through the transmission interface; transmitting, by the first SVC (SVC 1) (10), the address information to the second SVC (SVC 2) (20) through the transmission interface, where the address information comprises one or more first data storage addresses (ADDR 1) of the first memory (memory 1) (107), which are located in the plurality of first storage spaces for storing the written data associated with the write request; assigning, by the second SVC (SVC 2) (20), one or more second data storage addresses (ADDR 2) in the second memory (memory 2) (207), which correspond to the one or more first data storage addresses (ADDR 1), according to the received address information; transmitting, by the second SVC (SVC 2) (20), a message to the host (15) in order to inform the host (15) of starting to transmit the written data associated with the write request; receiving, by the second SVC (SVC 2) (20), the written data associated with the write request from the host (15); writing, by the second SVC (SVC 2) (20), the written data to the one or more second data storage addresses (ADDR 2) of the second memory (memory 2) (207); writing, by the second SVC (SVC 2) (20), the written data to the one or more first data storage addresses (ADDR 1) of the first memory (memory 1) (107) through the transmission interface; and informing, by the second SVC (SVC 2) (20), the host (15) of completion of the write request.

According to one embodiment of the present invention, the transmission interface is an inter-controller communications channel (ICC) that is established by a redundant controller communicating (RCC) interconnect controller (9).

According to one embodiment of the present invention, the address information further comprises the one or more second data storage addresses (ADDR 2) in the second memory (memory 2) (207).

According to one embodiment of the present invention, the method for accessing data in the data storage system architecture (1) further comprises a step of: attaching, by the second SVC (SVC 2) (20), the one or more second data storage addresses (ADDR 2) to the written data, when the second SVC (SVC 2) (20) receives the written data from the host (15).

According to one embodiment of the present invention, the step of receiving the written data from the host (15) and the step of attaching the one or more second data storage addresses (ADDR 2) to the written data both are performed by a second host-side I/O device interconnect controller (second host-side I/O controller, or host-side I/O controller 2) (201) of the second SVC (SVC 2) (20).

According to one embodiment of the present invention, the first SVC (SVC 1) (10) is coupled to the transmission interface through a first switch (switch 1) (103), and the second SVC (SVC 2) (20) is coupled to the transmission interface through a second switch (switch 2) (203).

According to one embodiment of the present invention, the first switch (switch 1) (103) and the second switch (switch 2) (203) further comprise a non-transparent bridge (NTB) function (1033, 2033).

According to one embodiment of the present invention, the second SVC (SVC 2) (20) stores, through the second switch (switch 2) (203), the written data to the one or more second data storage addresses (ADDR 2) of the second memory (memory 2) (207) and to the one or more first data storage addresses (ADDR 1) of the first memory (memory 1) (107).

According to one embodiment of the present invention, the method for accessing data in the data storage system architecture (1) further comprises steps of: informing, by the second SVC (SVC 2) (20), the first SVC (SVC 1) (10) that the written data have been successfully written to the one or more first data storage addresses (ADDR 1) of the first memory (memory 1) (107) and to the one or more second data storage addresses (ADDR 2) of the second memory (memory 2) (207); and transmitting, by the first SVC (SVC 1) (10), a confirmation message to the second SVC (SVC 2) (20) in order to inform the second SVC (SVC 2) (20) that the written data have been successfully written to the one or more first data storage addresses (ADDR 1) of the first memory (memory 1) (107).

According to one embodiment of the present invention, the second SVC (SVC 2) (20) further comprises a second multicast table (MT 2) (2031), and the second multicast table (MT 2) (2031) records one or more virtual multicast addresses (virtual multicast ADDR), and the one or more virtual multicast addresses (virtual multicast ADDR) correspond to the one or more first data storage addresses (ADDR 1) of the first memory (memory 1) (107) and to the one or more second data storage addresses (ADDR 2) of the second memory (memory 2) (207).

According to one embodiment of the present invention, the method for accessing data in the data storage system architecture (1) further comprises a step of: attaching, by a second host-side I/O device interconnect controller (second host-side I/O controller, or host-side I/O controller 2) (201) of the second SVC (SVC 2) (20), the one or more virtual multicast addresses (virtual multicast ADDR) to the written data, when the second SVC (SVC 2) (20) receives the written data from the host (15).

According to one embodiment of the present invention, through the one or more virtual multicast addresses (virtual multicast ADDR), a second switch (switch 2) of the second SVC (SVC 2) (20) writes the written data to the one or more data storage addresses (ADDR 2) of the second memory (memory 2) (207) and transmits the written data to the one or more data storage addresses (ADDR 1) of the first memory (memory 1) (107).

According to one embodiment of the present invention, the second multicast table (MT 2) (2031) is stored in a second switch (switch 2) (203) of the second SVC (SVC 2) (20).

According to one embodiment of the present invention, the plurality of second storage spaces are located in a second buffer (buffer 2) (2071) of the second memory (memory 2) (207), and one or more reserved second storage spaces of the plurality of second storage spaces correspond to the one or more data storage addresses (ADDR 2).

According to one embodiment of the present invention, the method for accessing data in the data storage system architecture (1) further comprises a step of: informing, by the second SVC (SVC 2) (20), the first SVC (SVC 1) (10) that the written data have already been written to the one or more first data storage addresses (ADDR 1) of the first memory (memory 1) (107), where the one or more first data storage addresses (ADDR 1) are located in a first buffer (buffer 1) (1071) of the first memory (memory 1) (107), while the one or more second data storage addresses (ADDR 2) are located in a second buffer (buffer 2) (2071) of the second memory (memory 2) (207).

According to one embodiment of the present invention, the method for accessing data in the data storage system architecture (1) further comprises a step of: storing, by the first SVC (SVC 1) (10), the written data stored at the one or more first data storage addresses (ADDR 1) of the first memory (memory 1) (107), to the first LD (LD 1) (12).

According to one embodiment of the present invention, the method for accessing data in the data storage system architecture (1) further comprises a step of: informing, by the first SVC (SVC 1) (10), the second SVC (SVC 2) of completion of the write request, when the first SVC (SVC 1) (10) stores the written data stored at the one or more first data storage addresses (ADDR 1) of the first memory (memory 1) (107), to the first LD (LD 1) (12).

According to one embodiment of the present invention, the method for accessing data in the data storage system architecture (1) further comprises a step of: transmitting, by the first SVC (SVC 1) (10), a confirmation message to the second SVC (SVC 2) (20) in order to inform the second SVC (SVC 2) (20) that the written data have been successfully written to the one or more first data storage addresses (ADDR 1) of the first memory (memory 1) (107).

According to one embodiment of the present invention, the second multicast table (MT 2) (2031) comprises a plurality of fields including a first field for recording the one or more virtual multicast addresses (virtual multicast ADDR), a second field for recording the one or more first data storage addresses (ADDR 1), and a third field for recording the one or more second data storage addresses (ADDR 2).

According to one embodiment of the present invention, the first SVC (SVC 1) (10) further comprises a first multicast table (MT 1) (1031) including a plurality of fields including a first field for recording the one or more virtual multicast addresses (virtual multicast ADDR), a second field for recording the one or more first data storage addresses (ADDR 1), and a third field for recording the one or more second data storage addresses (ADDR 2).

In light of the above problems, it is the object of the present invention to provide a method accessing data in a data storage system architecture (1) comprising a first storage virtualization controller (first SVC, SVC 1) (10), a second storage virtualization controller (second SVC, SVC 2) (20), and a storage pool (4), where the first SVC (SVC 1) (10) comprises a first central processing circuitry (first CPC, CPC 1) (105) and a first memory (memory 1) (107), and the second SVC (SVC 2) (20) comprises a second central processing circuitry (second CPC, CPC 2) (205) and a second memory (memory 2) (207), in which the first CPC (CPC 1) (105) is coupled to the second CPC (CPC 2) (205) through a transmission interface, and the first memory (memory 1) (107) comprises a plurality of first storage spaces, and the second memory (memory 2) (207) comprises a plurality of second storage spaces, the method comprising steps of: managing, by the first SVC (SVC 1) (10), a first logical drive (first LD, LD 1) (12) in the storage pool (4); receiving, by the second SVC (SVC 2) (20), a read request from a host (15), where the read request intends to read a set of read data from the first LD (LD 1) (12); inquiring, by the second SVC (SVC 2) (20), of the first SVC (SVC 1) (10) about address information through the transmission interface; transmitting, by the first SVC (SVC 1) (10), the address information to the second SVC (SVC 2) (20) through the transmission interface, where the address message comprises one or more first data storage addresses (ADDR 1) of the first memory (memory 1) (107), which are located in the plurality of first storage spaces for storing the read data associated with the read request; receiving and storing, by the second SVC (SVC 2) (20), the address information; transmitting, by the second SVC (SVC 2) (20), a message to the host (15) in order to inform the host (15) that the host (15) can receive the read data associated with the read request; reading, by the second SVC (SVC 2) (20), the read data from the one or more first data storage addresses (ADDR 1) of the first memory (memory 1) (107) through the transmission interface; and informing, by the second SVC (SVC 2) (20), the host (15) of completion of the read request.

According to one embodiment of the present invention, the transmission interface is an inter-controller communications channel (ICC) that is established by a redundant controller communicating (RCC) interconnect controller (9).

According to one embodiment of the present invention, the method for accessing data in the data storage system architecture (1) further comprises a step of: confirming, by the first SVC (SVC 1) (10), whether or not, in the first memory (memory 1) (107), there is the read data associated with the read request.

According to one embodiment of the present invention, the method for accessing data in the data storage system architecture (1) further comprises steps of: reading, by the first SVC (SVC 1) (10), the read data from the first LD (LD 1) (12) and storing, by the first SVC (SVC 1) (10), the read data to the one or more first data storage addresses (ADDR 1) of the first memory (memory 1) (107).

According to one embodiment of the present invention, the step of reading the read data from the one or more first data storage addresses (ADDR 1) of the first memory (memory 1) (107) is performed by a second host-side I/O device interconnect controller (second host-side I/O controller, or host-side I/O controller 2) (201) of the second SVC (SVC 2) (20).

According to one embodiment of the present invention, the first SVC (SVC 1) (10) is coupled to the transmission interface through a first switch (switch 1) (103), and the second SVC (SVC 2) (20) is coupled to the transmission interface through a second switch (switch 2) (203).

According to one embodiment of the present invention, the first switch (switch 1) (103) and the second switch (switch 2) (203) further comprise a non-transparent bridge (NTB) function (1033, 2033).

According to one embodiment of the present invention, the method for accessing data in the data storage system architecture (1) further comprises a step of: informing, by the second SVC (SVC 2) (20), the first SVC (SVC 1) (10) that the read data has been transmitted to the host (15).

In light of the above problems, it is the object of the present invention to provide a data storage system architecture (1), comprising: a storage pool (4) comprising a first logical drive (first LD, LD 1) (12), where the first LD (LD 1) (12) is formed by mapping one or more physical storage devices (PSDs); a first storage virtualization controller (first SVC, SVC 1) (10) comprising a first central processing circuitry (first CPC, CPC 1) (105), a first memory (memory 1) (107), where the first CPC (CPC 1) (105) is used to manage the first LD (LD 1) (12) and to present the first LD (LD 1) (12) to a host (15), and the first memory (memory 1) (107) comprises a plurality of first storage spaces; and a second storage virtualization controller (second SVC, SVC 2) (20) comprising a second central processing circuitry (second CPC, CPC 2) (205), a second memory (memory 2) (207), where the second CPC (CPC 2) (205) is coupled to the first CPC (CPC 1) (105) through a transmission interface, and the second memory (memory 2) (207) comprises a plurality of second storage spaces; wherein when the second SVC (SVC 2) (20) receives an input/output request (I/O request) from the host (15) to access the first LD (LD 1) (12), the second CPC (CPC 2) (205) of the second SVC (SVC 2) (20) inquires of the first SVC (SVC 1) (10) about address information; wherein the first SVC (SVC 1) (10) transmits the address information to the second SVC (SVC 2) (20) through the transmission interface, and the address information comprises one or more first data storage addresses (ADDR 1) of the first memory (memory 1) (107); and wherein the second SVC (SVC 2) (20) executes the I/O request according to the one or more first data storage addresses (ADDR 1).

According to one embodiment of the present invention, the first memory (memory 1) (107) further comprises a first buffer (buffer 1) (1071) for providing one or more reserved first storage spaces that correspond to the one or more first data storage addresses (ADDR 1), while the second memory (memory 2) (207) further comprises a second buffer (buffer 2) (2071) for providing one or more reserved second storage spaces that correspond to one or more second data storage addresses (ADDR 2).

According to one embodiment of the present invention, the first SVC (SVC 1) (10) further comprises a first host-side I/O device interconnect controller (first host-side I/O controller, host-side I/O controller 1) (101) to be used as a transmission interface between the first SVC (SVC 1) (10) and the host (15), while the second SVC (SVC 2) (20) further comprises a second host-side I/O device interconnect controller (second host-side I/O controller, host-side I/O controller 2) (201) to be used as a transmission interface between the second SVC (SVC 2) (20) and the host (15).

According to one embodiment of the present invention, the first SVC (SVC 1) (10) further comprises a first switch (switch 1) (103) having a non-transparent bridge (NTB) function (1033) that is internally coupled to the first CPC (CPC 1) (105) and to the first host-side I/O controller (host-side I/O controller 1) (101), and that is externally coupled to the second SVC (SVC 2) (20) through the transmission interface, while the second SVC (SVC 2) (20) further comprises a second switch (switch 2) (203) having a non-transparent bridge (NTB) function (2033) that is internally coupled to the second CPC (CPC 2) (205) and to the second host-side I/O controller (host-side I/O controller 2) (201), and that is externally coupled to the first SVC (SVC 1) (10) through the transmission interface.

According to one embodiment of the present invention, the first CPC (CPC 1) (105) and the first switch (switch 1) (103) are integrated on a single chip or are independent circuit modules, while the second CPC (CPC 2) (205) and the second switch (switch 2) (203) are integrated on a single chip or are independent circuit modules.

According to one embodiment of the present invention, the first host-side I/O device interconnect controller (host-side I/O controller 1) (101) and the first switch (switch 1) (103) are integrated on a single chip or are independent circuit modules, while the second host-side I/O device interconnect controller (host-side I/O controller 2) (201) and the second switch (switch 2) (203) are integrated on a single chip or are independent circuit modules.

According to one embodiment of the present invention, the first host-side I/O controller (host-side I/O controller 1) (101) and the first CPC (CPC 1) (105) are integrated on a single chip or are independent circuit modules, while the second host-side I/O controller (host-side I/O controller 2) (201) and the second CPC (CPC 2) (205) are integrated on a single chip or are independent circuit modules.

According to one embodiment of the present invention, the transmission interface is an inter-controller communications channel (ICC) that is established by a redundant controller communicating (RCC) interconnect controller (9).

According to one embodiment of the present invention, when the I/O request is a write request, the second SVC (SVC 2) (20) assigns, according to the received address information, one or more second data storage addresses (ADDR 2) of the second memory (memory 2) (207), which correspond to the one or more first data storage addresses (ADDR 1), or refers to a second multicast table (MT 2) (2031) in order to obtain one or more virtual multicast addresses (virtual multicast ADDR) which correspond to the one or more first data storage addresses (ADDR 1).

According to one embodiment of the present invention, the second SVC (SVC 2) (20) further comprises a second host-side I/O device interconnect controller (second host-side I/O controller, host-side I/O controller 2) (201) and a second switch (switch 2) (203), where the second host-side I/O controller (host-side I/O controller 2) (201) is used to receive written data associated with the write request from the host (15), used to attach the one or more second data storage addresses (ADDR 2) or the one or more virtual multicast addresses (virtual multicast ADDR) to the written data, and used to transmit the written data attached with the one or more second data storage addresses (ADDR 2) or attached with the one or more virtual multicast addresses (virtual multicast ADDR), to the second switch (switch 2) (203).

According to one embodiment of the present invention, after the second switch (switch 2) (203) receives the written data, the second switch (switch 2) (203) stores the written data to the one or more second data storage addresses (ADDR 2) of the second memory (memory 2) (207), and the second switch (switch 2) (203) stores, through the transmission interface, the written data to the one or more first data storage addresses (ADDR 1) of the first memory (memory 1) (107).

According to one embodiment of the present invention, after the second switch (switch 2) (203) receives the written data, the second switch (switch 2) (203) looks up a second multicast table (MT 2) (2031) according to the one or more virtual multicast addresses (virtual multicast ADDR) that is attached to the written data, in order to obtain the one or more first data storage addresses (ADDR 1) and the one or more second data storage addresses (ADDR 2), both of which correspond to the one or more virtual multicast addresses (virtual multicast ADDR), so that the second switch (switch 2) (203) performs a multicast operation to write the written data to the second memory (memory 2) (207) according to the one or more second data storage addresses (ADDR 2) and to the first memory (memory 1) (107) according to the one or more first data storage addresses (ADDR 1).

According to one embodiment of the present invention, when the I/O request is a read request, the second SVC (SVC 2) reads, through the transmission interface, a set of read data from the one or more first data storage addresses (ADDR 1) of the first memory (memory 1) (107), according to the address information.

DETAILED DESCRIPTION

Figure 1:
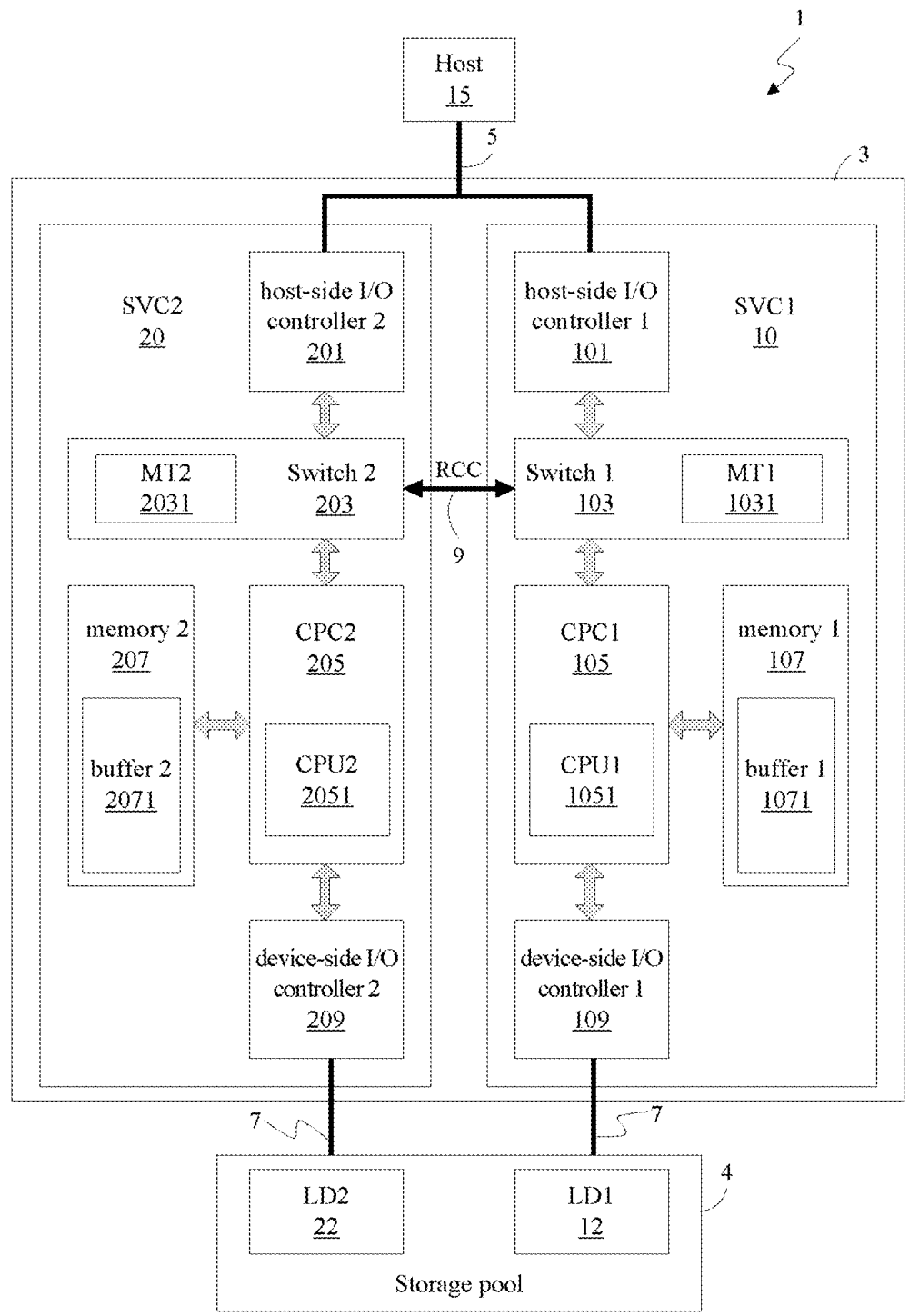
FIG. 1 shows a schematic diagram of a data storage system architecture 1 according to an embodiment of the present invention.

Please refer to FIG. 1 which shows a schematic diagram of a data storage system architecture (1) (hereinafter called "storage system architecture") according to an embodiment of the present invention. The storage system architecture (1) comprises a host (15), and a redundant array of independent disks subsystem (RAID subsystem) (3); hereinafter, the redundant array of independent disks subsystem (3) is called "RAID subsystem (3)". The RAID subsystem (3) is connected to the host (15) through a host-side I/O device interconnect (5). The RAID subsystem (3) further comprises a storage virtualization controller pair (SVC pair), also called "redundant pair", and a storage pool (4), where the SVC pair further comprises a first storage virtualization controller (SVC 1) (10) and a second storage virtualization controller (SVC 2) (20), and the storage pool (4) further comprises one or more physical storage devices (PSDs) which are virtualized to one or more logical disks (LDs). In one embodiment of the present invention, the one or more LDs further comprise a first logical disk (LD 1) (12) and a second logical disk (LD 2) (22). These two SVCs (10) and (20) are connected to the storage pool (4) through a device-side I/O device interconnect (7). Although the storage system architecture (1) in FIG. 1 comprises only one host (15) and only one RAID subsystem (3), in other embodiments of the present invention there may be one or more hosts (15) which are connected to the one or more RAID subsystems (3) through the host-side I/O device interconnect (5). Moreover, the number of the LDs comprised in the RAID subsystem (3) of the present invention is not limited to 2 as shown in FIG. 1 but can be more than 2, and there may be a plurality of logical sections divided into two groups, each of which is respectively managed by one of the two SVCs (10) and (20).

In the present invention, the LD 1 and LD 2 (12, 22) are formed by mapping, through the SVCs (10) and (20), the sections of one or more physical storage devices (PSDs). In one embodiment, one or more PSDs in the independent RAID subsystem (3) can be combined to form a PSD array. The PSD referred to here, in an embodiment of the present invention, can be a hard disk drive (HDD) or a solid state drive (SSD) with various transmission interfaces, or any physical storage devices that can be utilized to store data. In an embodiment of the present invention, the aforesaid transmission interface can be Advanced Technology Attachment (ATA), which is also called IDE, Serial ATA (SATA), Small Computer System Interface (SCSI), Serial-attached SCSI (SAS) or Fiber Channel (FC), or any other interfaces used for data transmission. There is a redundant controller communicating (RCC) interconnect controller (9) between the first SVC (SVC 1) (10) and the second SVC (SVC 2) (20). The first SVC (SVC 1) (10) and the second SVC (SVC 2) (20) may be connected by establishing, through the RCC interconnect controller (9), an inter-controller communications channel (ICC) between both of them in order to transmit data or messages to each other. A common implementation of the ICC is to use a communication link such as an Fiber Channel-Arbitrated Loop (FC-AL), a Parallel Small Computer Interface (Parallel SCSI) operating in the target mode, a Remote Direct Memory Access (RDMA), a Peripheral Component Interconnect Express (PCI-E), a Serial Advanced Technology Attachment (SATA) operating in the target mode, or any other communication interconnects which can achieve the function of the ICC, but not limited hereto.

In an embodiment of the present invention, the first SVC (SVC 1) (10) comprises a first host-side I/O device interconnect controller (or simplified as "first host-side I/O controller" or "host-side I/O controller 1") (101), a first switch (switch 1) (103) which has a non-transparent bridge (NTB) function (1033), a first central processing circuitry (CPC 1) (105), a first memory (memory 1) (107), and a first device-side I/O device interconnect controller (or simplified as "first device-side I/O controller" or "device-side I/O controller 1") (109), where the first switch (switch 1) (103) further comprises a first multicast table (MT 1) (1031), the first CPC (CPC 1) (105) further comprises a first central processing unit (CPU 1) (1051), and the first memory (memory 1) (107) further comprises a first cache buffer (buffer 1) (1071).

In an embodiment of the present invention, the second SVC (SVC 2) (20) comprises a second host-side I/O device interconnect controller (or simplified as "second host-side I/O controller" or "host-side I/O controller 2") (201), a second switch (switch 2) (203) which has a non-transparent bridge (NTB) function (2033), a second central processing circuitry (CPC 2) (205), a second memory (memory 2) (207), and a second device-side I/O device interconnect controller (or simplified as "second device-side I/O controller" or "device-side I/O controller 2") (209), where the second switch (switch 2) (203) further comprises a second multicast table (MT 2) (2031), the second CPC (CPC 2) (205) further comprises a second central processing unit (CPU 2) (2051), and the second memory (memory 2) (207) further comprises a second cache buffer (buffer 2) (2071).

In another embodiment of the present invention, the switch 1 (103) of the first SVC (SVC 1) (10) and/or the switch 2 (203) of the second SVC (SVC 2) (20) may not be equipped with the non-transparent bridge (NTB) function. In this case, the switch 1 (103) and/or the switch 2 (203) can achieve the same effect by externally connecting a port that has the non-transparent bridge (NTB) function. In an embodiment of the present invention, this port that has the NTB function may use the PCI-Express (PCI-E) protocol.

The first host-side I/O device interconnect controller (host-side I/O controller 1) (101) is connected to the host (15) through the host-side I/O device interconnect (5) for being used as an interface and buffer between the SVC 1 (10) and the host (15), and the host-side I/O controller 1 (101) can receive input/output (I/O) requests and the associated data from the host (15) and transfer and/or map them to the first central processing circuitry (CPC 1) (105). In addition, the first host-side I/O device interconnect controller (host-side I/O controller 1) (101) may comprise one or more first host-side ports (not shown) for coupling to the host (15). The interface of these first host-side ports can be Fibre Channel supporting fabric, point-to-point interconnect, common return circuit interconnect and/or dedicated circuit interconnect operating in the target mode, Parallel Small Computer System Interface (parallel SCSI) operating in the target mode, Ethernet network supporting the internet SCSI (iSCSI) protocol and operating in the target mode, Serial-Attached SCSI (SAS) operating in the target mode, or Serial Advanced Technology Attachment (SATA) operating in the target mode, but not limited thereto.

Similarly, the second host-side I/O device interconnect controller (host-side I/O controller 2) (201) is connected to the host (15) through the host-side I/O device interconnect (5) for being used as an interface and buffer between the SVC 2 (20) and the host (15), and the host-side I/O controller 2 (201) can receive I/O requests and the associated data from the host (15) and transfer and/or map them to the CPC 2 (205). In addition, the second host-side I/O device interconnect controller (host-side I/O controller 2 (201) may comprise one or more second host-side ports (not shown) for coupling to the host (15). The interface of these second host-side ports can be Fibre Channel supporting fabric, point-to-point interconnect, common return circuit interconnect and/or dedicated circuit interconnect operating in the target mode, Parallel Small Computer System Interface (Parallel SCSI) operating in the target mode, Ethernet network supporting the internet SCSI (iSCSI) protocol and operating in the target mode, Serial-Attached SCSI (SAS) operating in the target mode, or Serial Advanced Technology Attachment (SATA) operating in the target mode, but not limited thereto.

The first device-side I/O device interconnect controller (device-side I/O controller 1) (109) connects the CPC 1 (105) to the LD 1 and LD 2 (12, 22) for being used as an interface and buffer between the CPC 1 (105) and the device-side PSDs (physical storage devices) that are mapped into the LD 1 and LD 2 (12, 22), and the device-side I/O controller 1 (109) can receive I/O requests and the associated data from the CPC 1 (105) and transfer and/or map them from the CPC 1 (105), into the LD 1 and LD 2 (12, 22). In addition, the first device-side I/O device interconnect controller (device-side I/O controller 1) (109) may comprise one or more first device-side ports (not shown) for coupling to the one or more PSDs that are mapped into the LD 1 and LD 2 (12, 22). The interface of these first device-side ports can be Fibre Channel-Arbitrated Loop (FC-AL), Small Computer System Interface (SCSI), Serial-Attached SCSI (SAS), or Serial Advanced Technology Attachment (SATA) etc., but not limited thereto.

Similarly, the second device-side I/O device interconnect controller (device-side I/O controller 2) (209) connects the CPC 2 (205) to the LD 1 and LD 2 (12, 22) for being used as an interface and buffer between the CPC 2 (205) and the device-side PSDs that are mapped into the LD 1 and LD 2 (12, 22), and the device-side I/O controller 2 (209) can receive I/O requests and the associated data from the CPC 2 (205) and transfer and/or map them from the CPC 2 (205), into the LD 1 and LD 2 (12, 22). In addition, the second device-side I/O device interconnect controller (device-side I/O controller 2) (209) may comprise one or more second device-side ports (not shown) for coupling to the one or more PSDs that are mapped into the LD 1 and LD 2 (12, 22). The interface of these second device-side ports can be Fibre Channel-Arbitrated Loop (FC-AL), Small Computer System Interface (SCSI), Serial-Attached SCSI (SAS), or Serial Advanced Technology Attachment (SATA) etc., but not limited thereto.

In the RAID subsystem (3), if the operating configuration of the two SVCs (SVC 1 and SVC 2) (10, 20) is the active-active mode, and the two SVCs (SVC 1 and SVC 2) (10, 20) are in normal operation, the two SVCs (SVC 1 and SVC 2) (10, 20) will respectively present, manage, and process I/O requests targeting the LD 1 and LD 2 (12, 22) (or the LMU 1 and LMU 2) while the I/O requests appear in the RAID subsystem (3). In the active-active mode, the above-mentioned two SVCs (SVC 1 and SVC 2) (10, 20) are always ready to take over each other when the other SVC goes disability or out of service due to malfunction. In an embodiment of the present invention, the CPC 1 (105) is used to process and/or monitor I/O requests from the host (15), and transfer/map, between virtual and physical, I/O operations associated with the LD 1 (12) (i.e., LMU 1) according to the I/O requests from the host (15). In other words, the SVC 1 (10) that comprises the CPC 1 (105), has an ownership over the LD 1 (12). Similarly, the CPC 2 (205) is used to process and/or monitor I/O requests from the host (15), and transfer/map, between virtual and physical, I/O operations associated with the LD 2 (22) (i.e., LMU 2) according to the I/O requests from the host (15). In other words, the SVC 2 (20) that comprises the CPC 2 (205), has an ownership over the LD 2 (22).

The switch 1 (103) of the SVC 1 (10) is internally connected to the host-side I/O controller 1 (101) and the CPC 1 (105), and is externally connected to the switch 2 (203) of the SVC 2 (20) through the RCC interconnect controller (9). The switch 1 (103) is not only used to be a bidirectional transmission interface to the circuit blocks that are connected to the switch 1 (103) (for example, establishing the inter-controller communications channel (ICC) between the switch 1 (103) and the switch 2 (203) for transmitting information and/or data to each other), but also used to transmit the written data from the host (15), to the buffer 1 (1071) of the memory 1 (107) of the SVC 1 (10), or used to multicast the written data from the host (15), to the buffer 1 (1071) of the memory 1 (107) of the SVC 1 (10) and to the buffer 2 (2071) of the memory 2 (207) of the SVC 2 (20).

Figure 6:
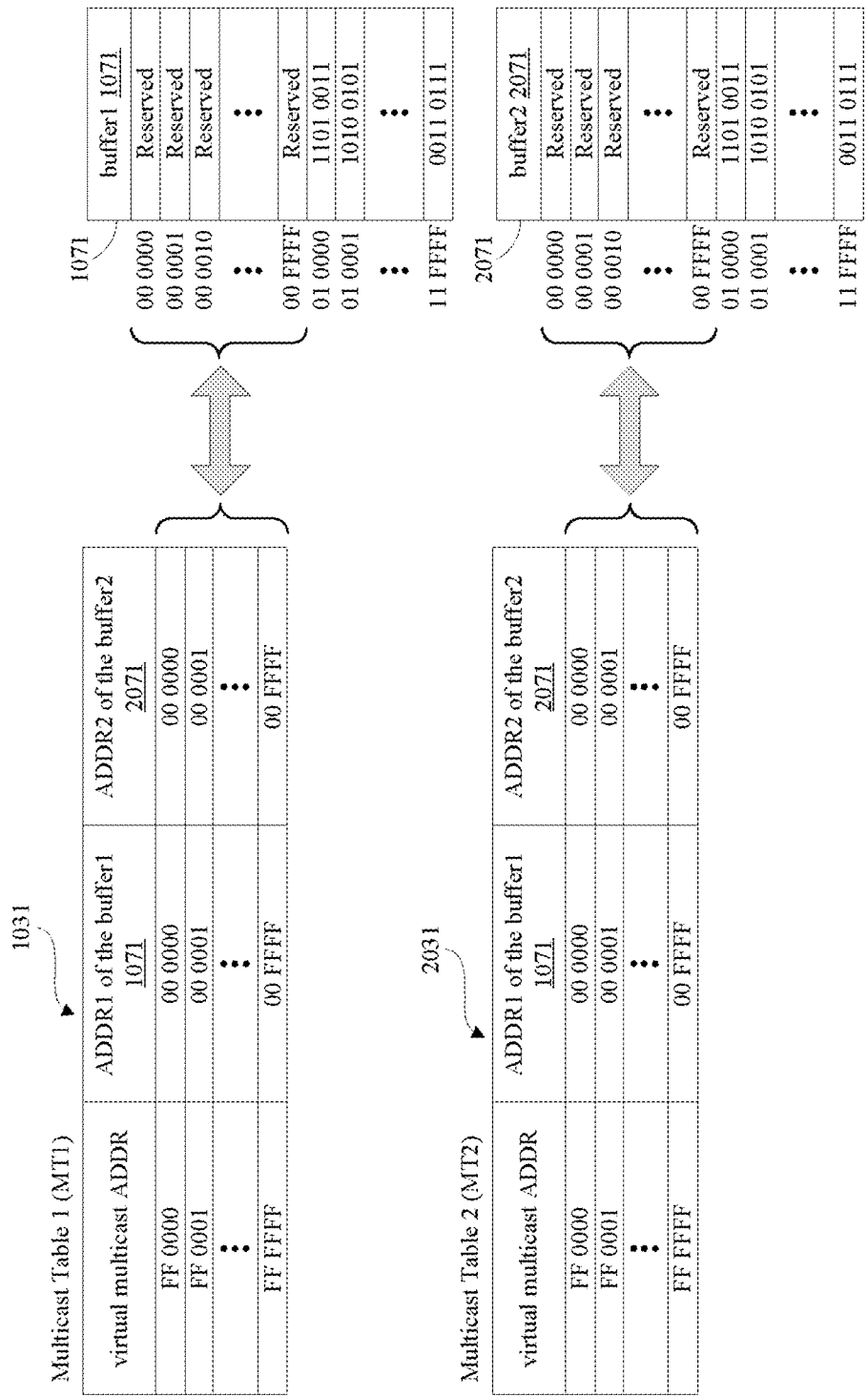
FIG. 6 shows a schematic diagram of the data structure of multicast tables of an embodiment according to the data storage system architecture 1 of the present invention.

Similarly, the switch 2 (203) of the SVC 2 (20) is internally connected to the host-side I/O controller 2 (201) and the CPC 2 (205), and is externally connected to the switch 1 (103) of the SVC 1 (10) through the RCC interconnect controller (9). The switch 2 (203) is not only used to be a bidirectional transmission interface between the circuit blocks that are connected to the switch 2 (203) (for example, establishing the inter-controller communications channel (ICC) between the switch 1 (103) and the switch 2 (203) for transmitting information and/or data to each other), but also used to transmit the written data from the host (15), to the buffer 2 (2071) of the memory 2 (207) of the SVC 2 (20), or used to multicast the written data from the host (15), to the buffer 2 (2071) of the memory 2 (207) of the SVC 2 (20) and to the buffer 1 (1071) of the memory 1 (107) of the SVC 1 (10). In addition, the switch 1 (103) manages a first multicast table (MT 1) (1031), and the switch 2 (203) manages a second multicast table (MT 2) (2031); however, in an embodiment of the present invention, the two multicast tables (MT 1 and MT 2) (1031, 2031) are respectively used to record the data storage addresses (ADDR 1 and ADDR 2) of the buffer 1 (1071) and the buffer 2 (2071) as well as the corresponding relationships therebetween, and used to record the multicast addresses that correspond to these data storage addresses (ADDR 1 and ADDR 2), wherein the written data from the host (15) are temporarily stored in the buffer 1 (1071) and in the buffer 2 (2071) according to these data storage addresses (ADDR 1 and ADDR 2). In an embodiment of the present invention, the schematic diagram of the two multicast tables (MT 1 and MT 2) (1031, 2031) are shown in FIG. 6, detailed descriptions of which will be explained below.

The memory 1 (107) of the SVC 1 (10) is connected to the CPC 1 (105) and is used as a buffer for buffering the data that is being transmitted between the host (15) and the LD 1 (12) through the CPC 1 (105). Similarly, the memory 2 (207) of the SVC 2 (20) is connected to the CPC 2 (205) and is used as a buffer for buffering the data that is being transmitted between the host (15) and the LD 2 (22) through the CPC 2 (205). In actual application, the memory 1 (107) and the memory 2 (207) can be implemented by a DRAM (Dynamic Random Access Memory) or SDRAM (Synchronous Dynamic Random. Access Memory). In addition, the buffer 1 (1071) of the memory 1 (107) and the buffer (2071) of the memory 2 (207) are used to temporarily store the written data (for example, DATA-H) from the host (15), which are going to be written into the LD 1 (12) and/or the LD 2 (22).

In an embodiment of actual application of the present invention, the components comprised in the SVC 1 (10), including the host-side I/O controller 1 (101), the switch 1 (103), the CPC 1 (105), the memory 1 (107), and the device-side I/O controller 1 (109), can be integrated to a single chip or distributed to one or more chips on demand. In an embodiment of the present invention, the host-side I/O controller 1 (101) and the switch 1 (103) can be integrated to the same single chip or may be independent circuit modules that separate from each other.

Similarly, the components comprised in the SVC 2 (20), including the host-side I/O controller 2 (201), the switch 2 (203), the CPC 2 (205), the memory 2 (207), and the device-side I/O controller 2 (209) can be integrated to a single chip or distributed to one or more chips on demand. In an embodiment of the present invention, the host-side I/O controller 2 (201) and the switch 2 (203) can be integrated to the same single chip or may be independent circuit modules that separate from each other.

Figure 2A:
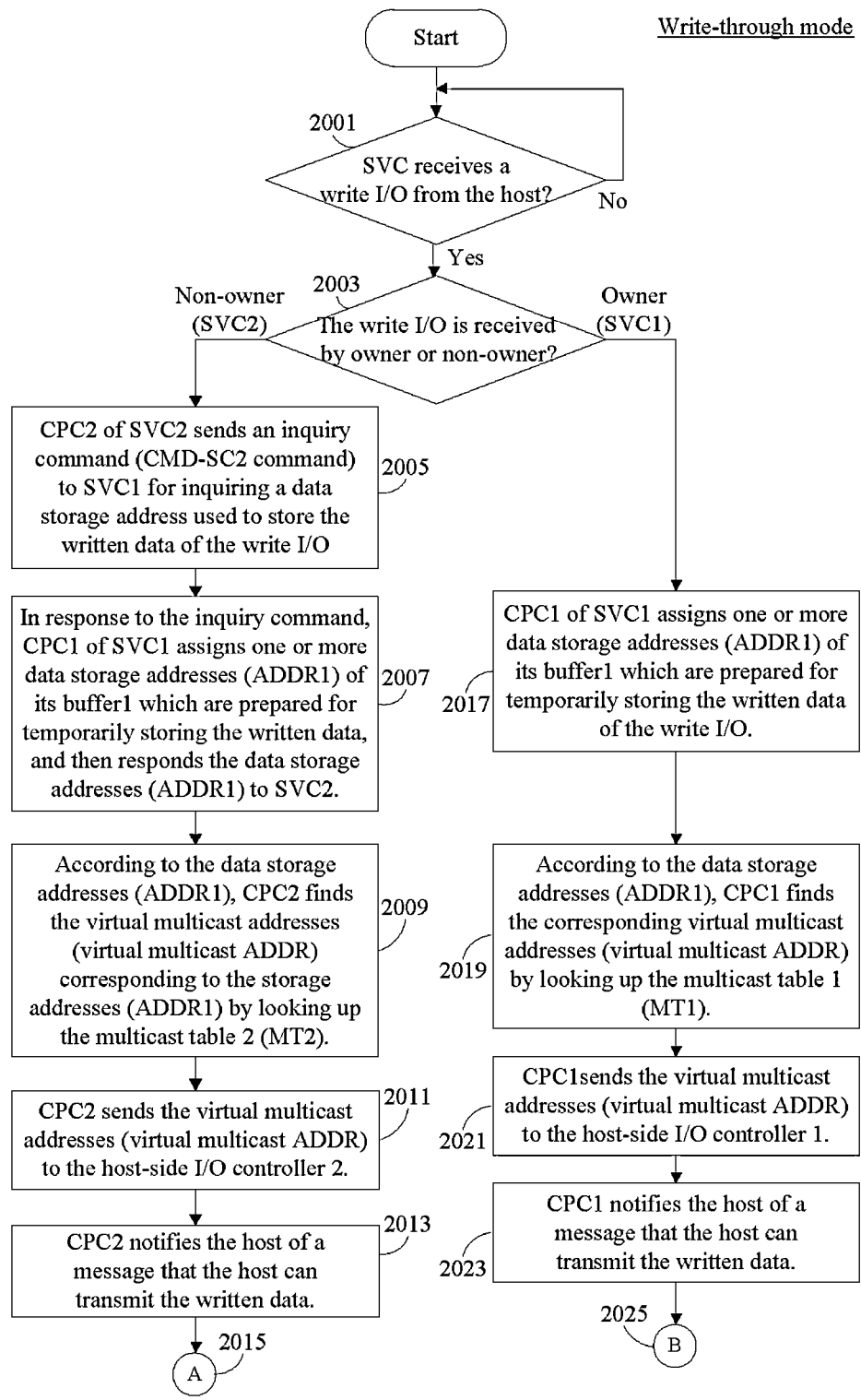
FIG. 2A shows the first part of the flowchart of the first embodiment for executing, under the write through mode, a data access method according to the data storage system architecture 1 of the present invention.
Figure 2B:
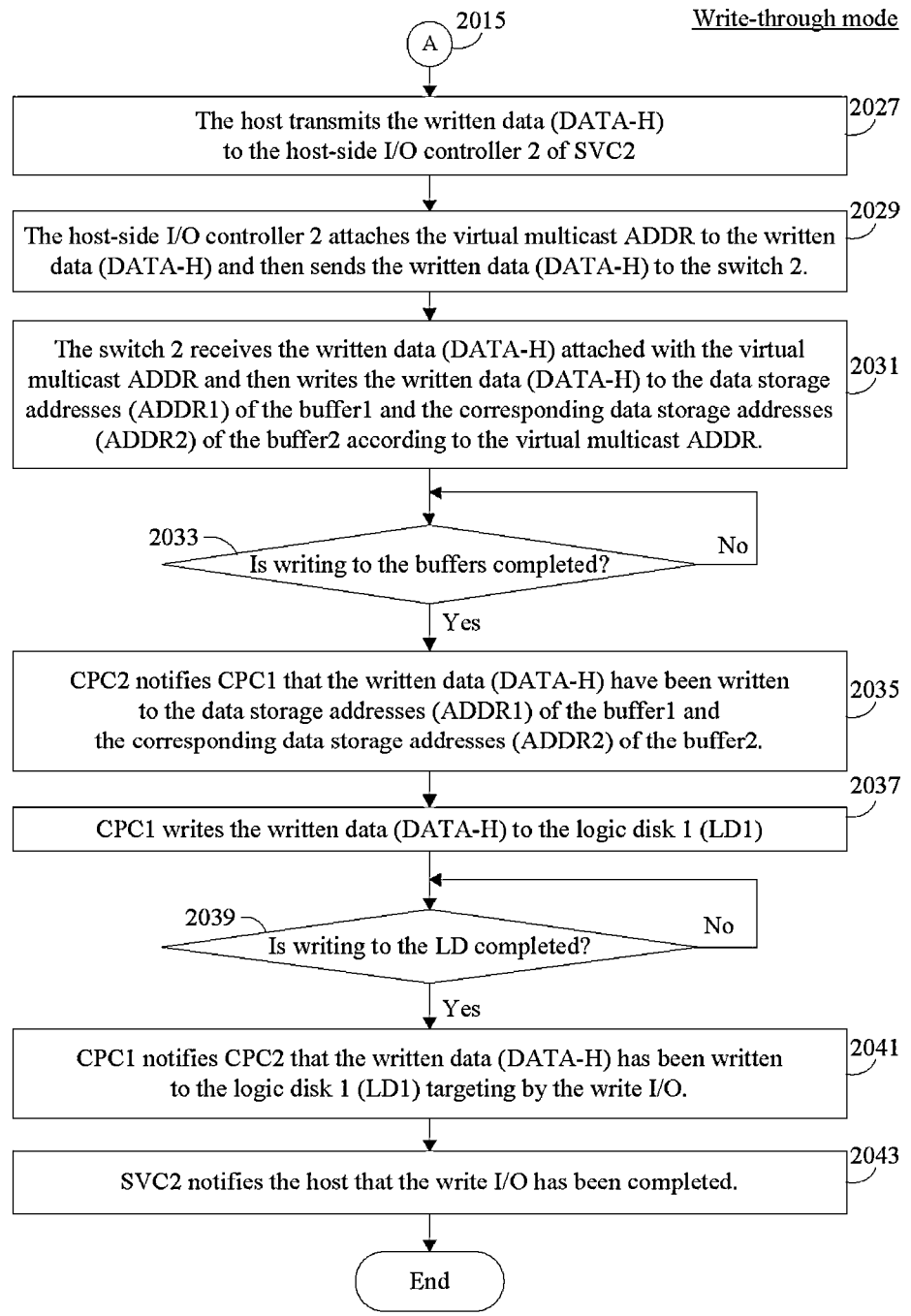
FIG. 2B shows the second part of the flowchart of the first embodiment for executing, under the write through mode, the data access method according to the data storage system architecture 1 of the present invention.
Figure 2C:
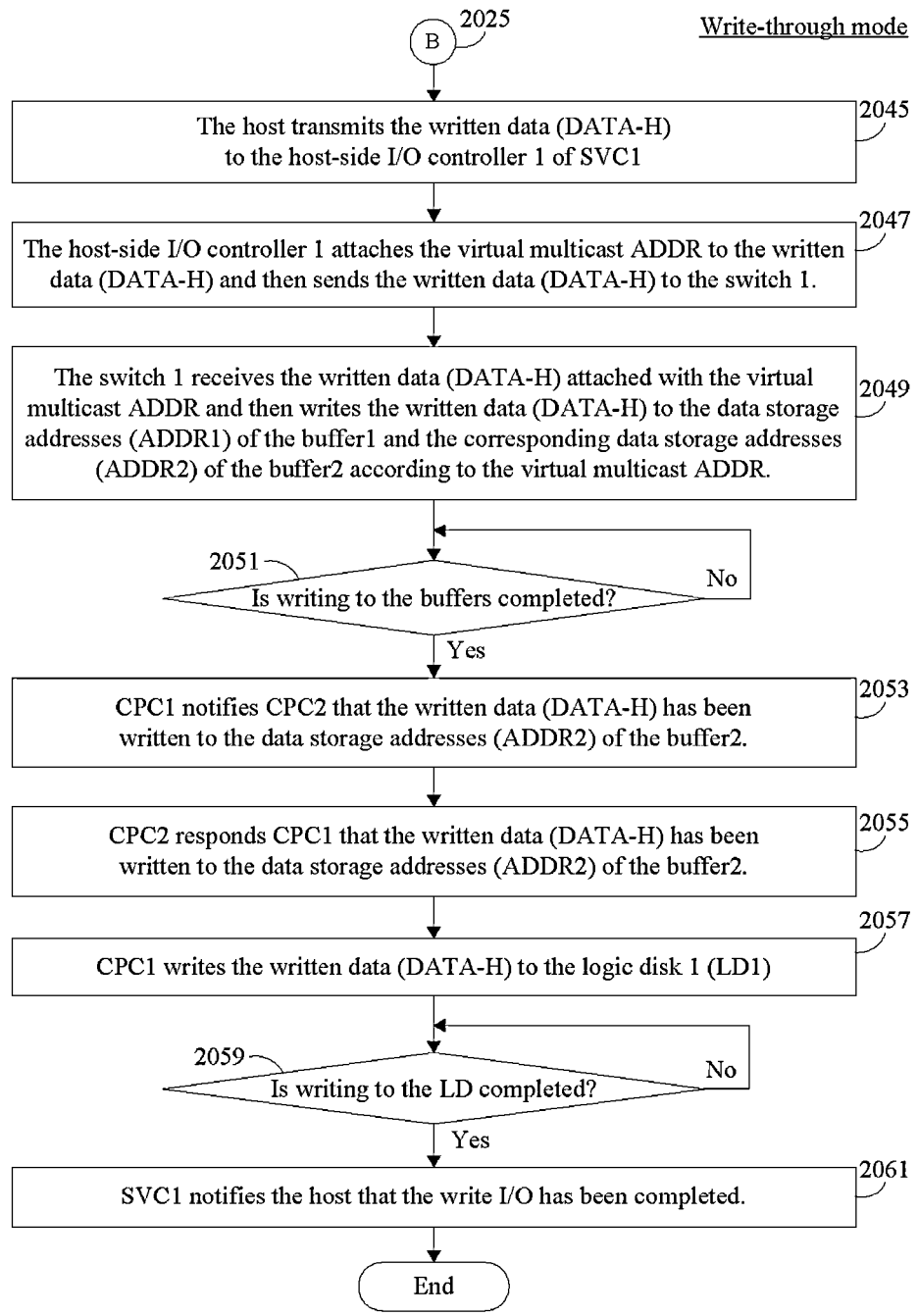
FIG. 2C shows the third part of the flowchart of the first embodiment for executing, under the write through mode, the data access method according to the data storage system architecture 1 of the present invention.
Figure 3A:
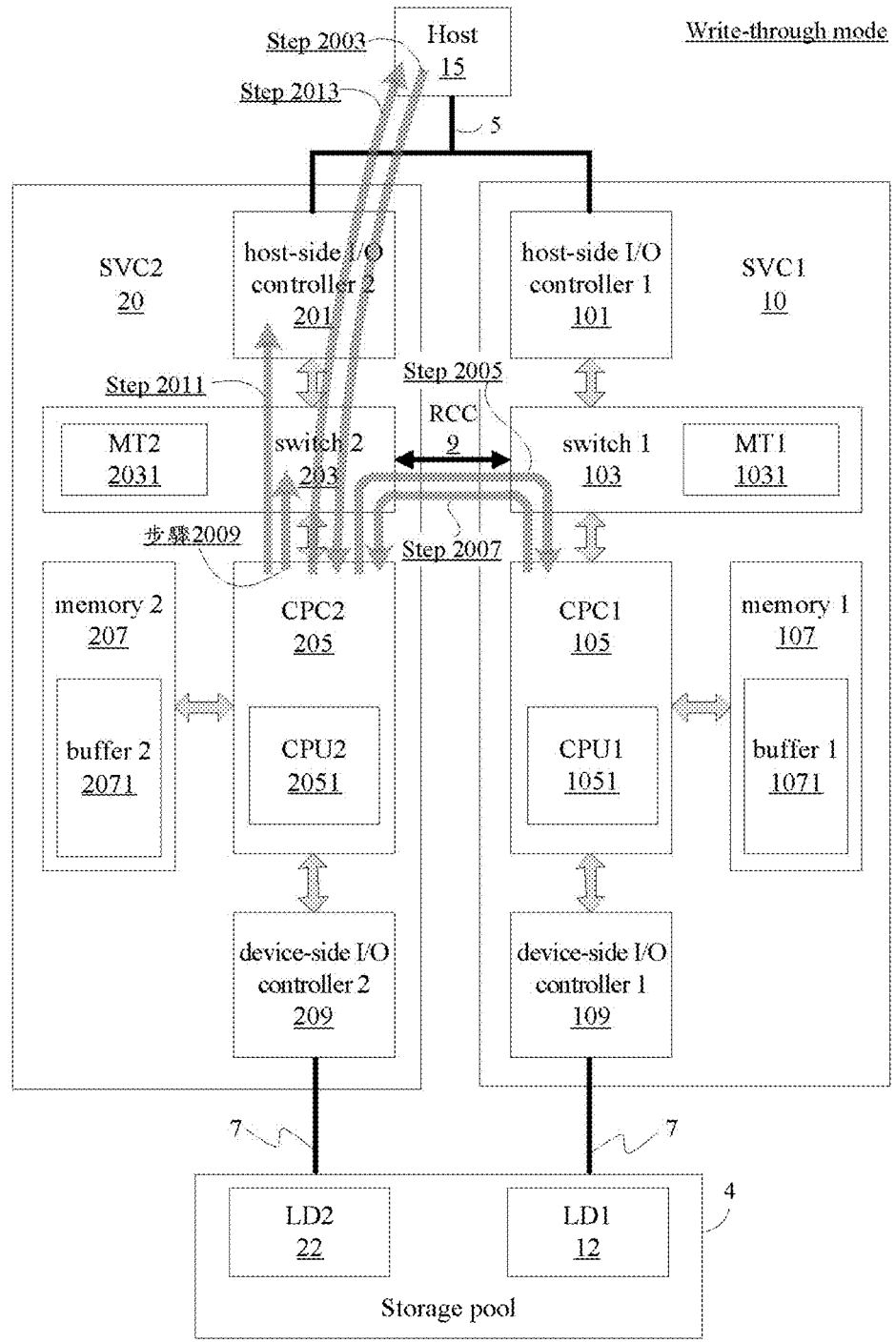
FIG. 3A shows a schematic diagram of signal transmission from step 2001 to step 2013 in FIG. 2A according to the data storage system architecture 1 of the present invention.
Figure 3B:
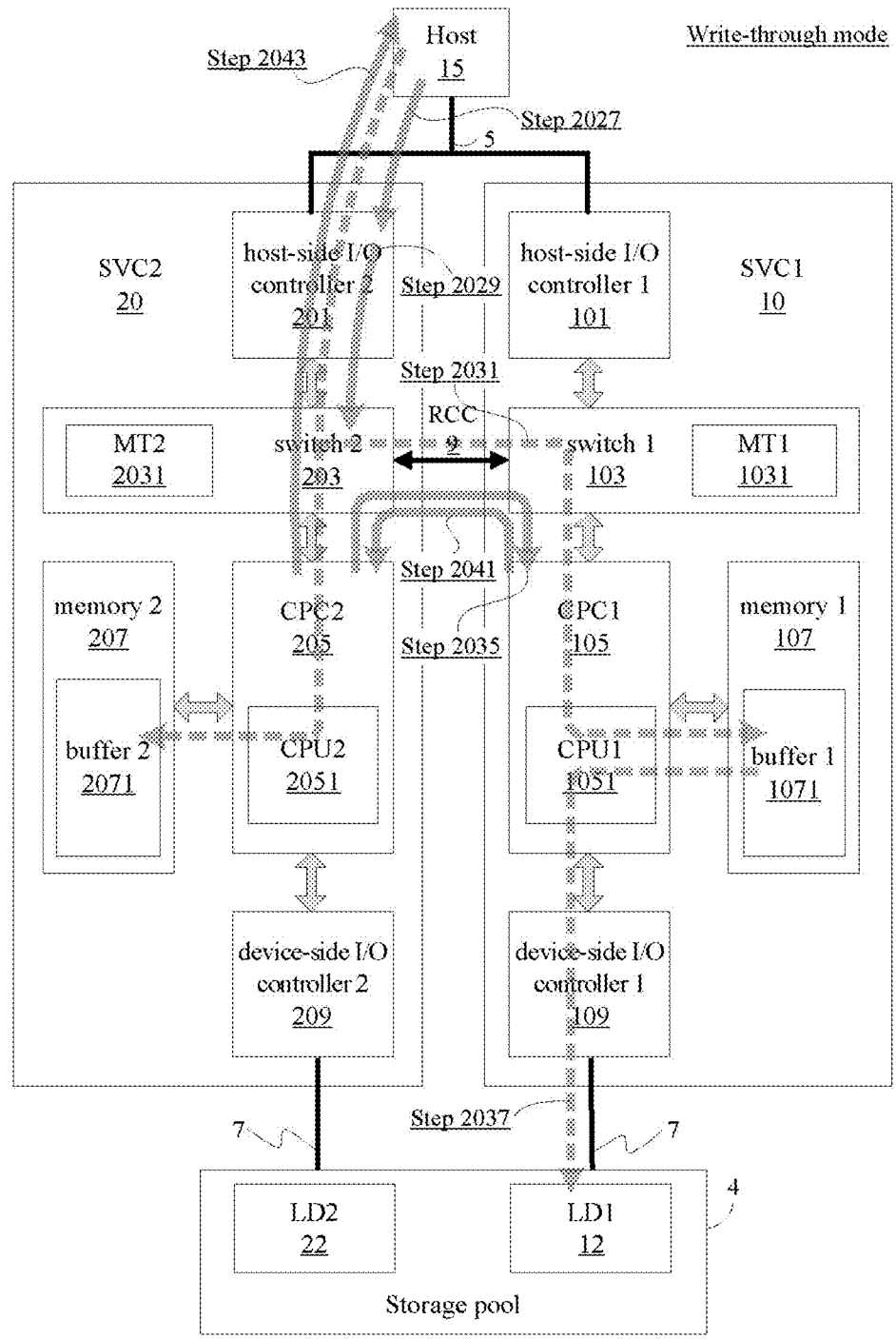
FIG. 3B shows a schematic diagram of signal transmission in FIG. 2B according to the data storage system architecture 1 of the present invention.
Figure 3C:
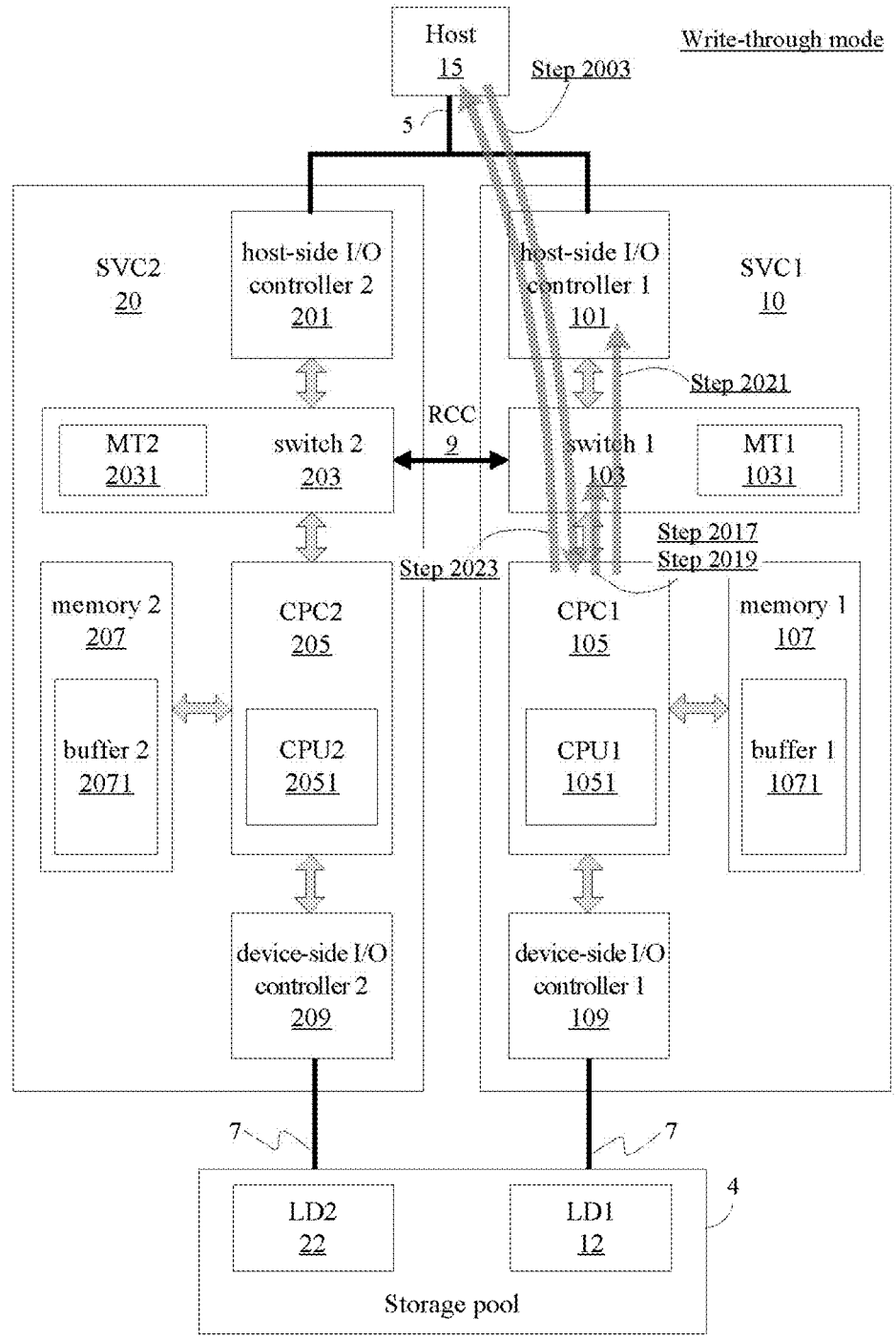
FIG. 3C shows a schematic diagram of signal transmission from step 2001 to step 2003 and from step 2017 to step 2023 in FIG. 2A according to the data storage system architecture 1 of the present invention.
Figure 3D:
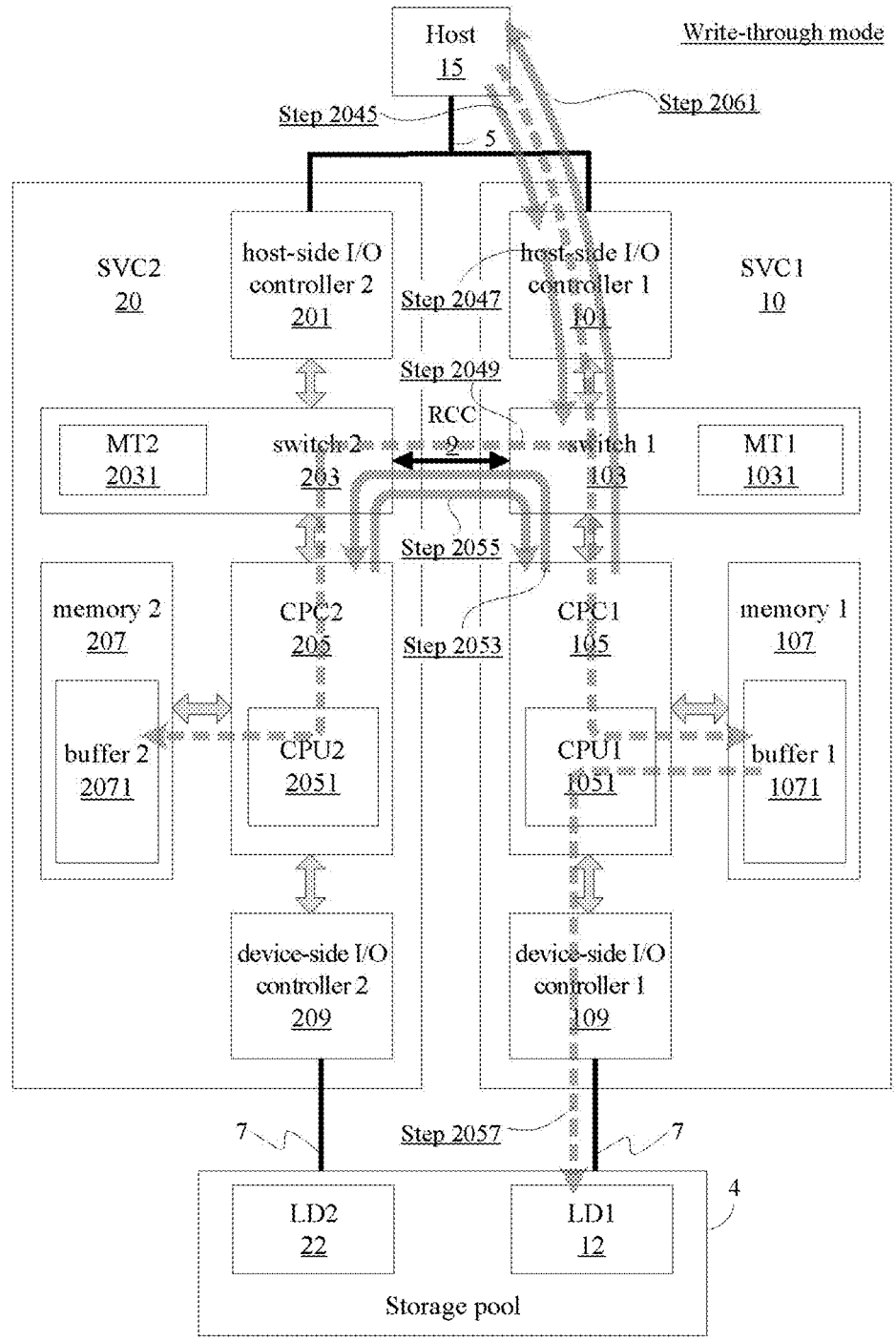
FIG. 3D shows a schematic diagram of signal transmission in FIG. 2C according to the data storage system architecture 1 of the present invention.

Please refer to FIG. 2A to FIG. 2C and FIG. 3A to FIG. 3D. FIG. 2A shows the first part of the flowchart of the first embodiment for executing, under the write through mode, a data access method according to the data storage system architecture (1) of the present invention. FIG. 2B shows the second part of the flowchart of the first embodiment for executing, under the write through mode, the data access method according to the data storage system architecture (1) of the present invention. FIG. 2C shows the third part of the flowchart of the first embodiment for executing, under the write through mode, the data access method according to the data storage system architecture (1) of the present invention. FIG. 3A to FIG. 3B show the schematic diagrams of the signal transmission for executing the data access method shown in FIG. 2A and FIG. 2B according to the data storage system architecture (1) of the present invention. FIG. 3C to FIG. 3D show schematic diagrams of signal transmission for executing the data access method shown in FIG. 2A and FIG. 2C according to the data storage system architecture (1) of the present invention.

Please refer to FIG. 2A and FIG. 3A. FIG. 2A takes the data storage system architecture (1) as an example to illustrate the first part of the flowchart of the first embodiment of the present invention. FIG. 3A shows the schematic diagrams of the signal transmission from step 2001 to step 2013 in FIG. 2A according to the data storage system architecture (1) of the present invention. For example, when the host (15) intends to write a set of written data (DATA-H) to the LD 1 (12) of the RAID subsystem (3), the host (15) will issue an I/O request, or herein also called a write request to the RAID subsystem (3) and the write request may be sent to any SVC in the RAID subsystem (3). In this example, it is assumed that the owner of the LD 1 (12) is the SVC 1 (10). When one SVC (for example, the SVC 1 (10) or the SVC 2 (20)) in the RAID subsystem (3) receives the write request from the host (15) (host write request) (step 2001), the receiving SVC (for example, the SVC 1 (10) or the SVC 2 (20)) that receives the host write request will determine, through the information carried by the host write request, which one of the LDs (in this case, it is the LD 1 (12)) the host (15) intends to write the written data (DATA-H) to, and accordingly will know whether or not the receiving SVC itself has the ownership over the LD (i.e., the LD 1 (12)), to which the written data (DATA-H) associated with the host write request are going to be written (step 2003).

One determination result of above step 2003 may be that the host write request is received by a non-owner SVC (in this case, it is the SVC 2 (20) that receives the host write request); in other words, the SVC 2 (20) receives the host write request which asks to write a set of written data (DATA-H) to the LD 1 (12) (step 2003), but the LD 1 (12) is managed by the other SVC (in this case, it is the SVC 1 (10) that manages the LD 1 (12)). In this case, the SVC 2 (20) needs to inquire of the owner (i.e., SVC 1 (10)) about address information including the associated information on "the action of writing the written data (DATA-H) to the LD 1 (12)", because the SVC 2 (20) that receives the host write request, is not the owner of the LD 1 (12) (step 2005). In an embodiment of the present invention, the specific implementation of such an inquiry may be that the CPC 2 (205) of the SVC 2 (20) sends an inquiry command (CMD-SC2 command) to the SVC 1 (10) through the ICC that is established by the RCC interconnect controller (9), wherein the inquiry command inquires of the SVC 1 (10) about which one or more storage spaces that are represented by the one or more data storage addresses of the buffer 1 (1071) of the memory 1 (107), are going to be used to store the written data (DATA-H) that are associated with the host write request (step 2005). After the SVC 1 (10) receives the inquiry command (CMD-SC2 command), the SVC 1 (10) will assign a storage space in the buffer 1 (1071), which may correspond to one or more data storage addresses (for example, ADDR 1), for temporarily storing the written data (DATA-H) associated with the host write request, and then will reply the corresponding one or more data storage addresses (for example, ADDR 1) to the SVC 2 (20) (step 2007). The CPC 2 (205) of the SVC 2 (20) will look up, according to the one or more data storage addresses (for example, ADDR 1), the MT 2 (2031) stored in the switch 2 (203) to find out one or more virtual multicast addresses (virtual multicast ADDR), which correspond to the one or more data storage addresses (for example, ADDR 1) (step 2009). Next, the CPC 2 (205) of the SVC 2 (20) will send the one or more virtual multicast addresses (virtual multicast ADDR) to the host-side I/O controller 2 (201) of the SVC 2 (20) (step 2011) in order to allow the host-side I/O controller 2 (201) to attach, upon receipt of the written data (DATA-H) from the host (15), the one or more virtual multicast addresses (virtual multicast ADDR) to the written data (DATA-H), so that the switch 2 (203) which subsequently receives the written data (DATA-H), will know that the written data (DATA-H) attached with the one or more virtual multicast addresses (virtual multicast ADDR) need to be simultaneously written to the assigned locations in both of the buffer 1 (1071) and the buffer 2 (2071). Afterwards, the CPC 2 (205) issues a message to the host (15) to inform the host (15) that it is alright to start sending the written data (DATA-H) to the SVC 2 (20) (step 2013). Next, the process goes to the node A (step 2015), the subsequent steps of which are shown in FIG. 2B.

Please refer to FIG. 2B and FIG. 3B at the same time. Following above-mentioned step 2013, the process goes to steps 2027 to 2043 in FIG. 2B through the node A, so as to execute the second part of the flowchart of the first embodiment shown in FIG. 2B, while FIG. 3B shows the schematic diagram of the signal transmission thereof. When the host (15) is notified that the transmission of the written data (DATA-H) is permitted, the host (15) will send the written data (DATA-H) to the SVC 2 (20), and the written data (DATA-H) will be received by the host-side I/O controller 2 (201) (step 2027). When the SVC 2 (20) receives the written data (DATA-H), the host-side I/O controller 2 (201) of the SVC 2 (20) will attach the one or more virtual multicast addresses (virtual multicast ADDR) received from the CPC 2 (205), to the written data (DATA-H), thus forming a set of "written data (DATA-H) attached with the virtual multicast ADDR", and then will transmit the "written data (DATA-H) attached with the virtual multicast ADDR" to the switch 2 (203) of the SVC 2 (20) (step 2029). After receiving the "written data (DATA-H) attached with the virtual multicast ADDR", the switch 2 (203) will identify the one or more virtual multicast ADDR and will look up the multicast table (MT 2) (2031) according to the one or more virtual multicast addresses (virtual multicast ADDR) in order to ensure the destinations, to which the "written data (DATA-H) attached with the virtual multicast ADDR" are going to be written, and then the switch (203) will multicast the written data (DATA-H) to the buffer 1 (1071) of the SVC 1 (10) and to the buffer 2 (2071) of the SVC 2 (20) according to both the data storage addresses (ADDR 1 and ADDR 2) of the buffer 1 (1071) and the buffer 2 (2071) (step 2031). During the process of multicasting, the CPC 2 (205) of the SVC 2 (20)

will keep checking and determining whether or not the written data (DATA-H) have been successfully written to the destinations that are associated with the data storage addresses (ADDR 1) of the buffer 1 (1071) of the SVC 1 (10) and the data storage addresses (ADDR 2) of the buffer 2 (2071) of the SVC 2 (20) (step 2033), until it is determined that the written data (DATA-H) have been successfully written to the two buffers (1071, 2071) of the two SVCs (10, 20). Then, the process goes to the next step.

When it is determined in step 2033 that the written data (DATA-H) have been successfully written to the two buffers (1071, 2071), the SVC 2 (20) that receives the written data (DATA-H) may transmit the necessary operating status information to the other SVC (i.e., the SVC 1 (10)) which cooperates with the SVC 2 (20) to form the SVC pair. Such action of transmitting the operating status information is achieved through the ICC established between the two SVCs (10, 20) by the RCC interconnect controller (9). The action of transmitting the operating status information comprises one step of informing, by the CPC 2 (205) of the SVC 2 (20), the CPC 1 (105) of the SVC 1 (10) that the written data (DATA-H) have been successfully written to the buffer 1 (1071) according to the data storage addresses (ADDR 1) of the buffer 1 (1071) of the SVC 1 (10) and written to the buffer 2 (2071) according to the data storage addresses (ADDR 2) of the buffer 2 (2071) of the SVC 2 (20) (step 2035), so that the CPC 1 (105) of the SVC 1 (10) can know that the written data (DATA-H) have been successfully written to the assigned data storage addresses (ADDR 1) of the buffer 1 (1071). Afterwards, the CPC 1 (105) of the SVC 1 (10) may proceed with the subsequent steps; one of the examples is writing the written data (DATA-H) to the LD 1 (12). In addition, the CPC 1 (105) of the SVC 1 (10) may be informed by the CPC 2 (205) of the SVC 2 (20) to know that there is a set of back-up data stored in the SVC 2 (20), which is identical to the written data (DATA-H).

When the CPC 1 (105) of the SVC 1 (10) knows that the CPC 2 (205) of the SVC 2 (20) has written the written data (DATA-H) to the buffer 1 (1071) according to the data storage addresses (ADDR 1) (i.e., after step 2035), the CPC 1 (105) of the SVC 1 (10) may start writing the written data (DATA-H) temporarily stored in the buffer 1 (1071), to the LD 1 (12) (step 2037). In the course of writing the written data (DATA-H), the CPC 1 will keep checking and determining whether or not the written data (DATA-h) have been successfully written to the LD 1 (12) (step 2039).

When it is determined that the written data (DATA-H) have been successfully written to the LD 1 (12), the CPC 1 (105) of the SVC 1 (10) will notify the CPC 2 (205) of the SVC 2 (20) that the written data (DATA-H) have been successfully written to the LD 1 (12) (step 2041). After the CPC 2 (205) of the SVC 2 (20) receives the write completion notification from the CPC 1 (105) of the SVC 1 (10), the CPC 2 (205) of the SVC 2 (20) will inform the host (15) that the host write request previously issued by the host (15), is completed (step 2043).

Please refer to FIG. 2A and FIG. 3C at the same time. FIG. 2A takes the data storage system architecture (1) as an example to illustrate the first part of the flowchart of the first embodiment of the present invention. FIG. 3C shows the schematic diagram of the signal transmission from step 2001 to step 2003 and from step 2017 to step 2023 in FIG. 2A according to the data storage system architecture (1) of the present invention. For example, when the host (15) intends to write a set of written data (DATA-H) to the LD 1 (12), the host (15) will issue a host write request to the RAID subsystem (3), and the host write request may be issued to any one of the SVCs in the RAID subsystem (3). In this example, it is assumed that the owner of the LD 1 (12) is the SVC 1 (10). When one SVC (for example, the SVC 1 (10) or the SVC 2 (20)) in the RAID subsystem (3) receives the host write request (step 2001), the receiving SVC (for example, the SVC 1 (10) or the SVC 2 (20)) that receives the host write request will determine, through the information carried by the host write request, which one of the LDs (in this case, it is the LD 1 (12)) the host (15) intends to write the written data (DATA-H) to, and accordingly will know whether or not the receiving SVC itself has the ownership over the LD (i.e., the LD 1 (12)), to which the written data (DATA-H) associated with the host write request are going to be written (step 2003).

One determination result of above step 2003 may be that the host write request is received by the owner SVC (in this case, it is the SVC 1 (10) that receives the host write request); in other words, the SVC 1 (10) receives the host write request which asks to write a set of written data (DATA-H) to the LD 1 (12) managed by the SVC 1 (10) itself (step 2003). In this case, because the SVC 1 (10) that receives the host write request is the owner of the LD 1 (12), the SVC 1 (10) itself can determine which one or more storage spaces that are represented by the one or more data storage addresses of the buffer 1 (1071) are assigned to temporarily store the written data (DATA-H) that are associated with the host write request (step 2017). The CPC 1 (105) of the SVC 1 (10) will look up, according to the one or more data storage addresses (ADDR 1), the MT 1 (1031) stored in the switch 1 (103) in order to find out the one or more virtual multicast addresses (virtual multicast ADDR) that correspond to the one or more data storage addresses (ADDR 1) (step 2019). Afterwards, the CPC 1 (105) of the SVC 1 (10) will transmit the one or more virtual multicast addresses (virtual multicast ADDR) to the host-side I/O controller 1 (101) (step 2021) in order to allow the host-side I/O controller 1 (101) to attach, upon receipt of the written data (DATA-H) from the host (15), the one or more virtual multicast addresses (virtual multicast ADDR) to the written data (DATA-H), so that the switch 1 (103) which subsequently receives the written data, will know that the written data (DATA-H) attached with the one more virtual multicast addresses (virtual multicast ADDR) need to be simultaneously written to the assigned locations in both of the buffer 1 (1071) and the buffer 2 (2071). Afterwards, the CPC 1 (105) issues a message to the host (15) to inform the host (15) that it is alright to start sending the written data (DATA-H) to the SVC 1 (10) (step 2023). Next, the process goes to the Node B (step 2025), the subsequent steps of which are shown in FIG. 2C.

Please refer to FIG. 2C and FIG. 3D at the same time. Following above step 2023, the process goes to step 2045 to step 2061 in FIG. 2C through the Node B (step 2025) in order to execute the third part of the flowchart of the first embodiment shown in FIG. 2C, while FIG. 3D shows the schematic diagram of associated signal transmission. When the host (15) is notified that the transmission of the written data (DATA-H) is permitted, the host (15) will transmit the written data (DATA-H) to the SVC 1 (10), and the written data (DATA-H) will be received by the host-side I/O controller 1 (101) of the SVC 1 (10) (step 2045). When the SVC 1 (10) receives the written data (DATA-H), the host-side I/O controller 1 (101) of the SVC 1 (10) will attach the one or more virtual multicast addresses (virtual multicast ADDR) to the written data (DATA-H), thus forming a set of "written data (DATA-H) attached with the virtual multicast ADDR", and then will transmit the "written data (DATA-H) attached with the virtual multicast ADDR" to the switch 1 (103) of the SVC 1 (10) (step 2047). After receiving the "written data (DATA-H) attached with the virtual multicast ADDR", the switch 1 (103) will identify the one or more virtual multicast ADDR and will look up the MT 1 (1031) according to the one or more virtual multicast ADDR, in order to ensure the destinations, to which the "written data (DATA-H) attached with the virtual multicast ADDR" are going to be written, and then the switch 1 (103) will multicast the written data (DATA-H) to the buffer 1 (1071) of the SVC 1 (10) and to the buffer 2 (2071) of the SVC 2 (20) according to both the data storage addresses ADDR 1 and ADDR 2 of the buffer 1 (1071) and the buffer 2 (2071) (step 2049). During the process of multicasting, the CPC 1 (105) of the SVC 1 (10) will keep checking and determining whether or not the written data (DATA-H) have been successfully written to the destinations that are associated with the data storage addresses (ADDR 1) of the buffer (1071) of the SVC 1 (10) and associated with the data storage addresses (ADDR 2) of the buffer 2 (2071) of the SVC 2 (20) (step 2051), until it is determined that the written data (DATA-H) have been successfully written to the two buffers (1071, 2071) of the two SVCs (10, 20). Then, the process goes to the next step.

When it is determined in step 2051 that the written data (DATA-H) have been successfully written to the two buffers (1071, 2071), the SVC 1 (10) that receives the host written data (DATA-H) may transmit the necessary operating status information to the other SVC (i.e., the SVC 2 (20)) that cooperates with the SVC 1 (10) to form the SVC pair. Such action of transmitting the operating status information is achieved through the ICC established by the RCC interconnect controller (9) between the two SVCs (SVC 1 and SVC 2) (10, 20). The action of transmitting the operating status information comprises one step of informing, by the CPC 1 (105) of the SVC 1 (10), the CPC 2 (205) of the SVC 2 (20) that the written data (DATA-H) have been successfully written to the buffer 2 (2071) according to the data storage addresses (ADDR 2) of the buffer 2 (2071) of the SVC 2 (20) (step 2053). In this way, the CPC 2 (205) of the SVC 2 (20) can know that the written data (DATA-H) have been successfully written to the SVC 2 (20) at the data storage addresses (ADDR 2) of the buffer 2 (2071) for reconfirmation and the subsequent processing. When the CPC 2 (205) of the SVC 2 (20) confirms that the written data (DATA-H) have been successfully written to the data storage addresses (ADDR 2) of the buffer 2 (2071) of the SVC 2 (20), the CPC 2 (205) of the SVC 2 (20) will transmit a confirmation message (write completion notification) to the CPC 1 (105) of the SVC 1 (10) through the ICC that is established by the RCC interconnect controller (9). In this way, the CPC 1 (105) of the SVC 1 (10) will know that the written data (DATA-H) have been successfully written to the buffer 2 (2071) according to the data storage addresses (ADDR 2) of the buffer 2 (2071) of the SVC 2 (20) (step 2055).

When the CPC 1 (105) of the SVC 1 (10) receives the confirmation message from the SVC 2 (20), the SVC 1 (10) will know that the written data (DATA-H) have been successfully written to the buffer 2 (2071) according to the data storage addresses (ADDR 2) of the buffer 2 (2071) of the SVC 2 (20). Afterwards, the CPC 1 (105) may start writing the written data (DATA-H) temporarily stored in the buffer 1 (1071), to the LD 1 (12) (step 2057). In the course of writing the written data (DATA-H), the CPC 1 (105) will keep checking and determining whether or not the written data (DATA-H) have been successfully written to the LD 1 (12) (step 2059).

When it is determined that the written data (DATA-H) have been successfully written to the LD 1 (12), the CPC 1 (105) of the SVC (10) will inform the host (15) that the host write request previously issued by the host (15), is completed (step 2061).

Figure 4A:
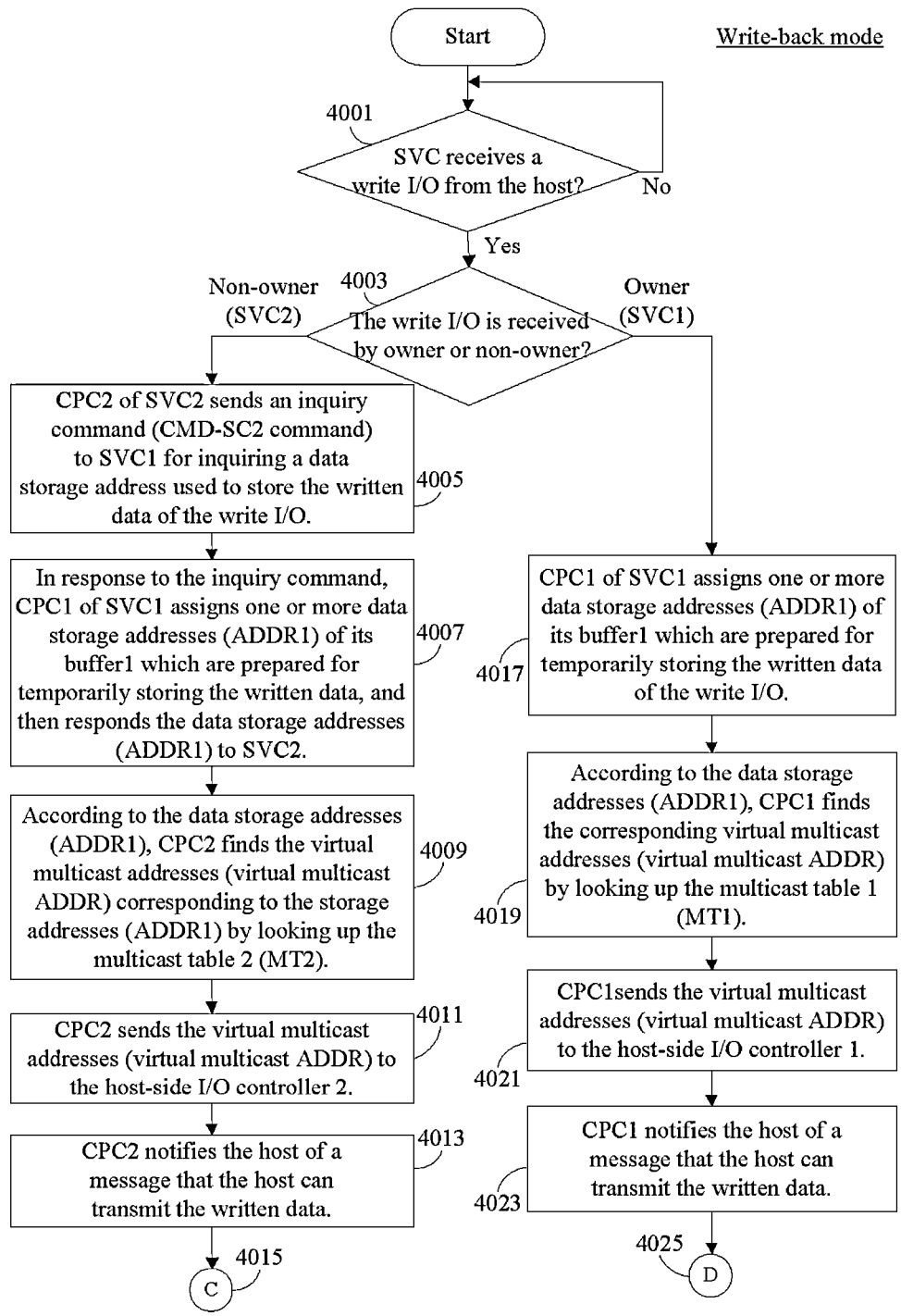
FIG. 4A shows the first part of the flowchart of the second embodiment for executing, under the write back mode, a data access method according to the data storage system architecture 1 of the present invention.
Figure 4B:
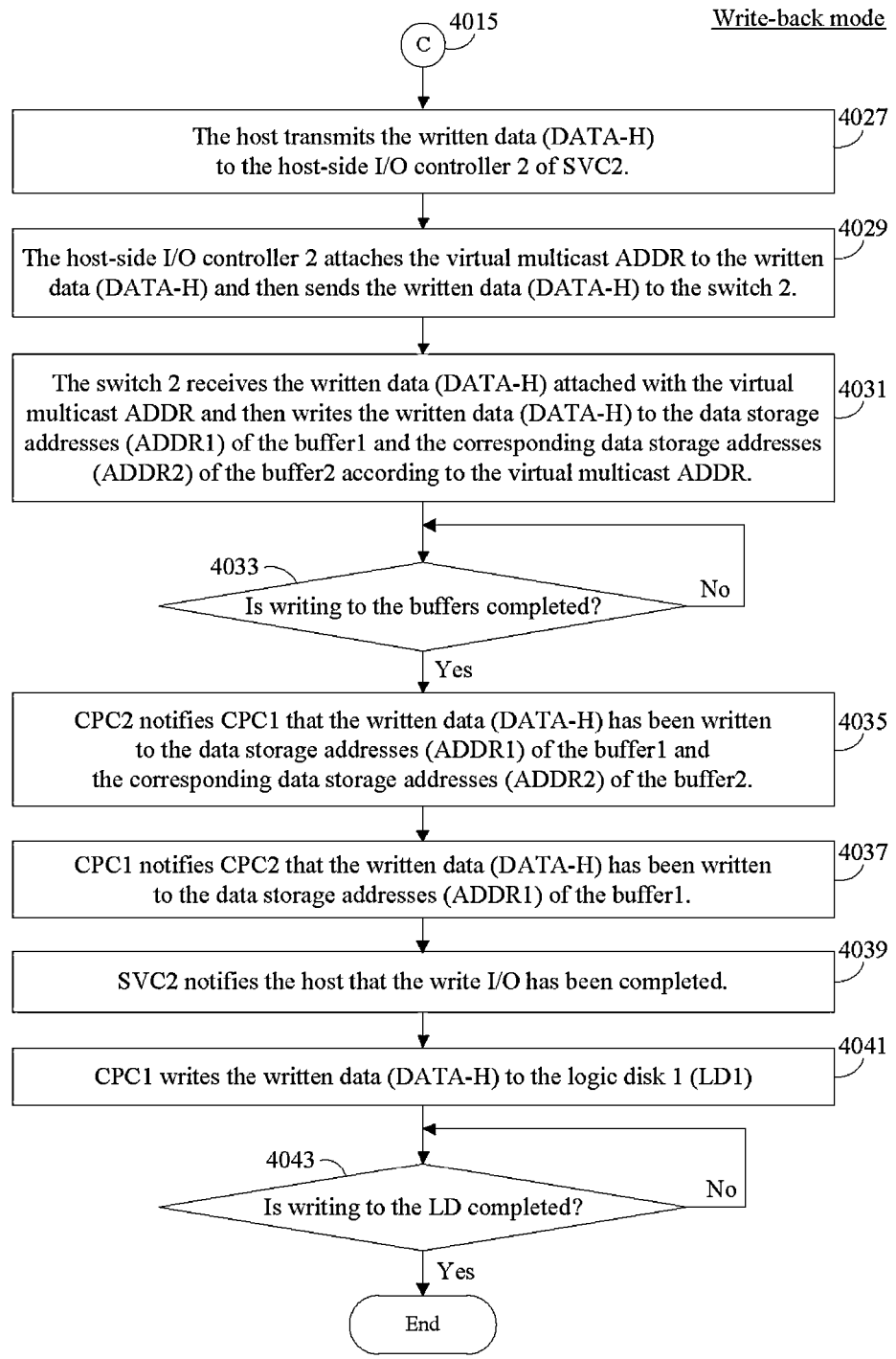
FIG. 4B shows the second part of the flowchart of the second embodiment for executing, under the write back mode, the data access method according to the data storage system architecture 1 of the present invention.
Figure 4C:
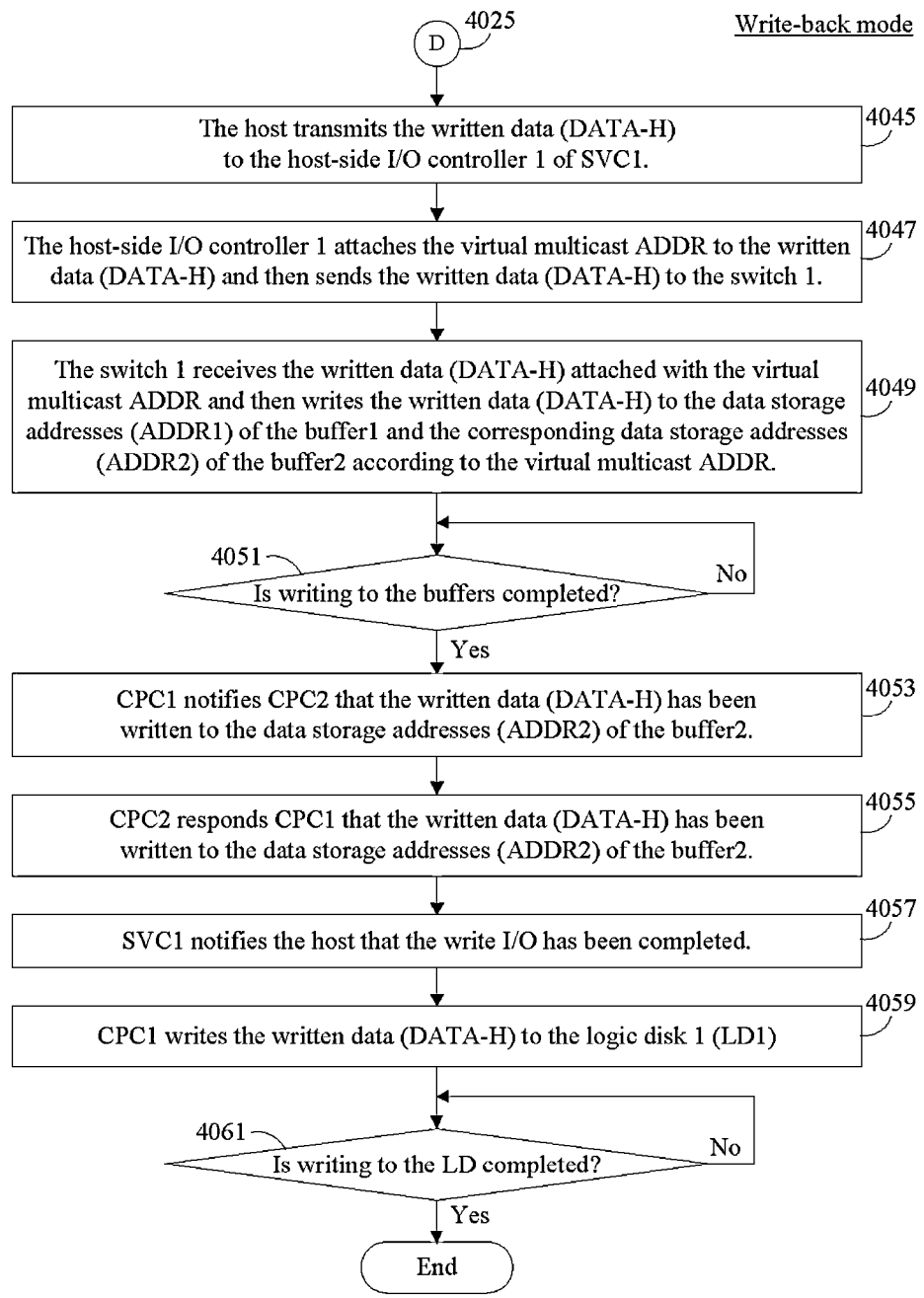
FIG. 4C shows the third part of the flowchart of the second embodiment for executing, under the write back mode, the data access method according to the data storage system architecture 1 of the present invention.
Figure 5A:
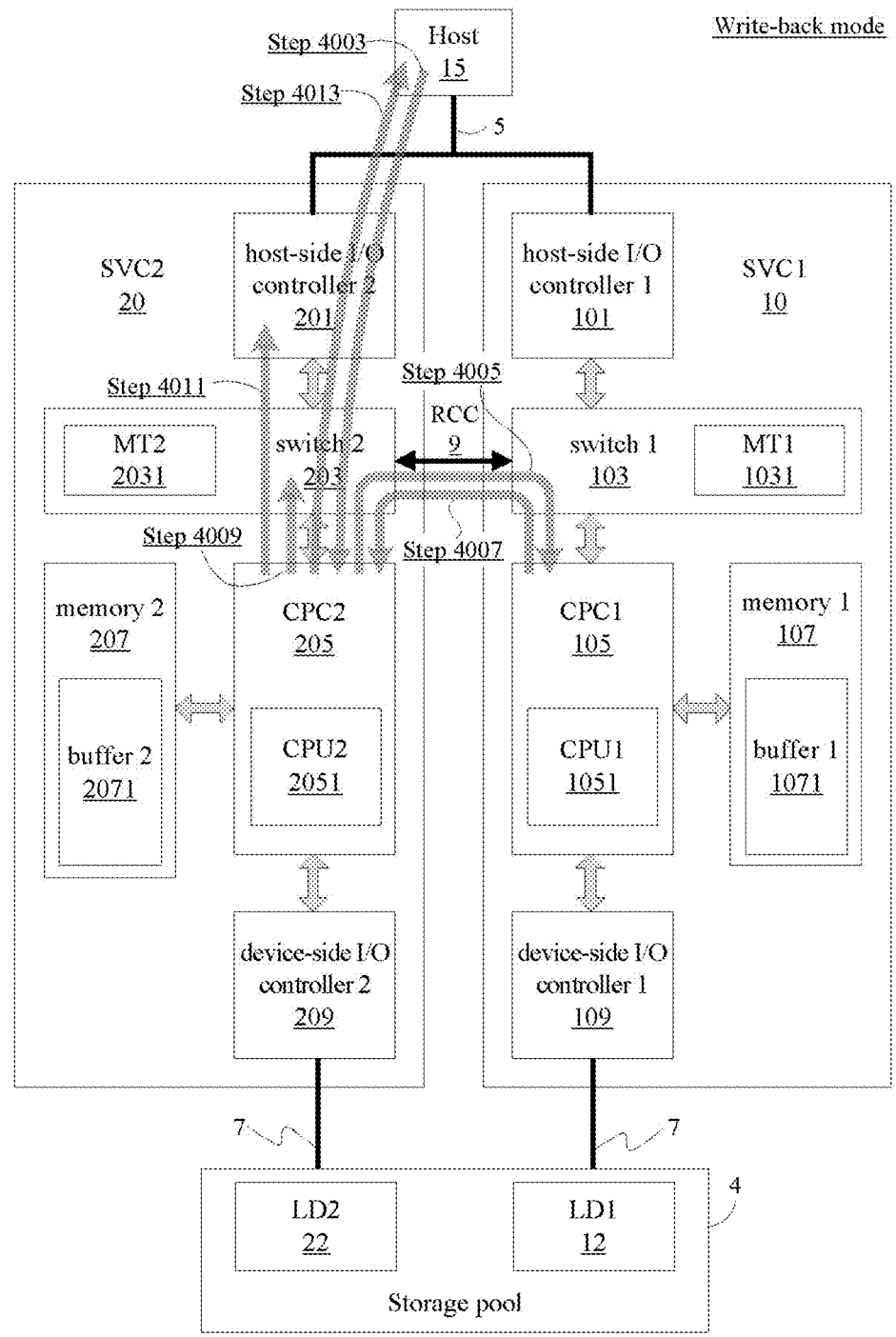
FIG. 5A shows a schematic diagram of signal transmission from step 4001 to step 4013 in FIG. 4A according to the data storage system architecture 1 of the present invention
Figure 5B:
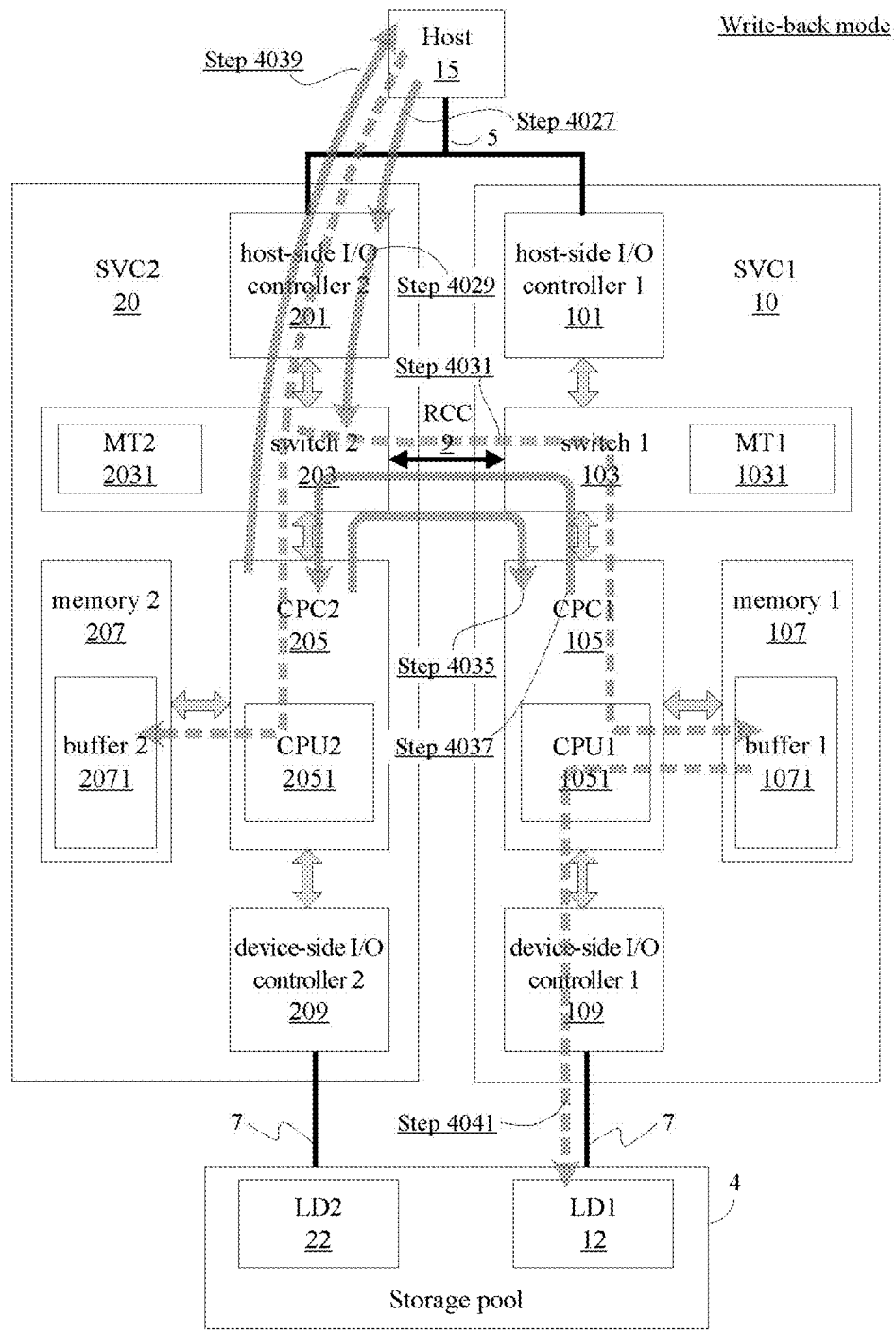
FIG. 5B shows a schematic diagram of signal transmission in FIG. 4B according to the data storage system architecture 1 of the present invention.
Figure 5C:
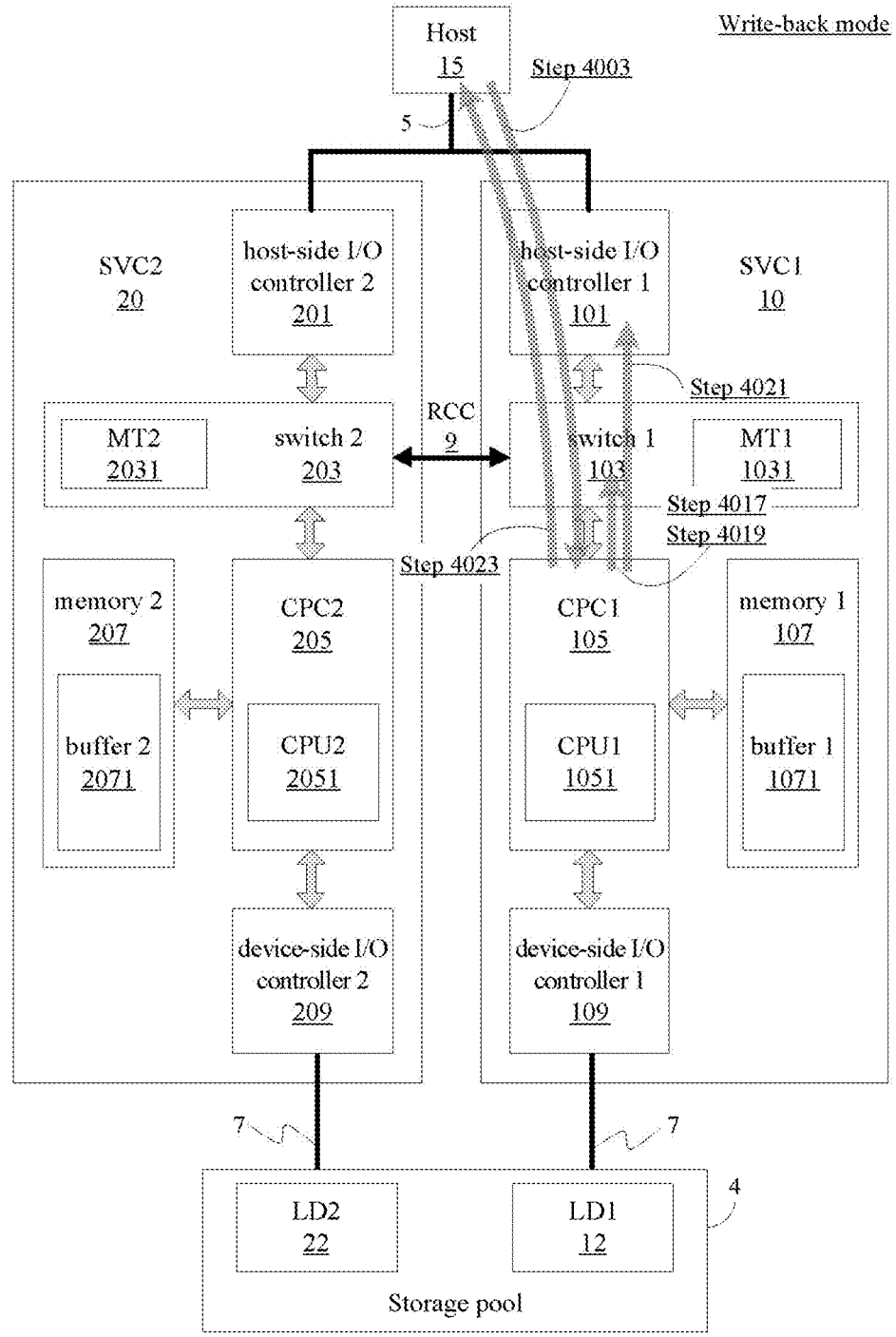
FIG. 5C shows a schematic diagram of signal transmission from step 4001 to step 4003 and from step 4017 to step 4023 in FIG. 4A according to the data storage system architecture 1 of the present invention.
Figure 5D:
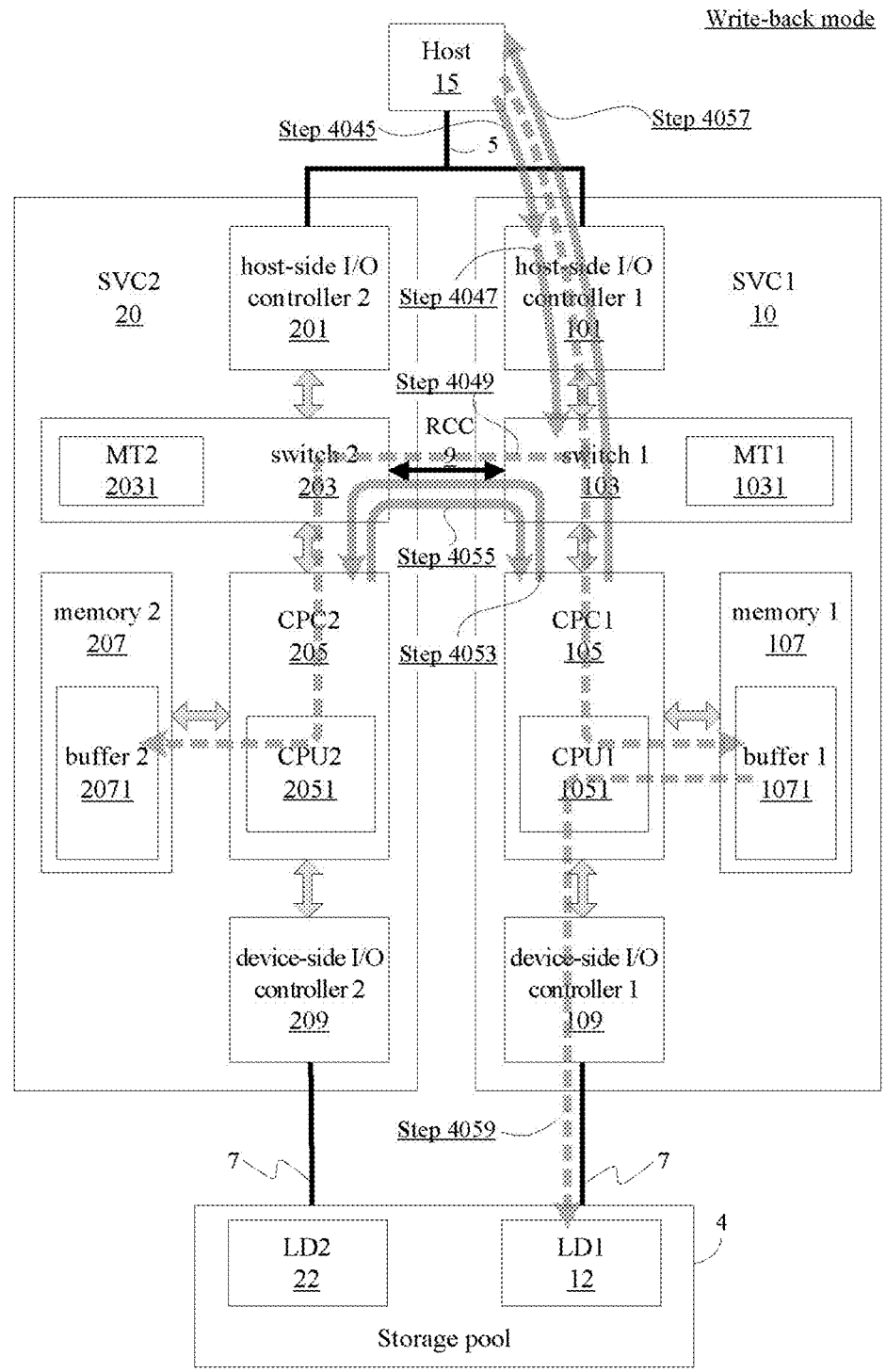
FIG. 5D shows a schematic diagram of signal transmission in FIG. 4C according to the data storage system architecture 1 of the present invention.

Please refer to FIG. 4A to FIG. 4C and FIG. 5A to FIG. 5D. FIG. 4A shows the first part of the flowchart of the second embodiment for executing, under the write back mode, a data access method according to the data storage system architecture (1) of the present invention. FIG. 4B shows the second part of the flowchart of the second embodiment for executing, under the write back mode, the data access method according to the data storage system architecture (1) of the present invention. FIG. 4C shows the third part of the flowchart of the second embodiment for executing, under the write back mode, the data access method according to the data storage system architecture (1) of the present invention. FIG. 5A to FIG. 5B show the schematic diagrams of the signal transmission for executing the data access method shown in FIG. 4A and FIG. 4B according to the data storage system architecture (1) of the present invention. FIG. 5C to FIG. 5D show schematic diagrams of the signal transmission for executing the data access method shown in FIG. 4A and FIG. 4C according to the data storage system architecture (1) of the present invention.

Please refer to FIG. 4A and FIG. 5A. FIG. 4A takes the data storage system architecture (1) as an example to illustrate the first part of the flowchart of the second embodiment of the present invention. FIG. 5A shows the schematic diagram of the signal transmission from step 4001 to step 4013 in FIG. 4A according to the data storage system architecture (1) of the present invention. For example, when the host (15) intends to write a set of written data (DATA-H) to the LD 1 (12) of the RAID subsystem (3), the host (15) will issue a host write request to the RAID subsystem (3) and the write request may be sent to any SVC in the RAID subsystem (3). In this example, it is assumed that the owner of the LD 1 (12) is the SVC 1 (10). When one SVC (for example, the SVC 1 (10) or the SVC 2 (20)) in the RAID subsystem (3) receives the host write request from the host (15) (step 4001), the receiving SVC (for example, the SVC 1 (10) or the SVC 2 (20)) that receives the host write request will determine, through the information carried by the host write request, which one of the LDs (in this case, it is the LD 1 (12)) the host (15) intends to write the written data (DATA-H) to, and accordingly will know whether or not the receiving SVC itself has the ownership over the LD (i.e., the LD 1 (12)), to which the written data (DATA-H) associated with the host write request are going to be written (step 4003).

One determination result of above step 4003 may be that the host write request is received by a non-owner SVC (in this case, it is the SVC 2 (20) that receives the host write request); in other words, the SVC 2 (20) receives the host write request which asks to write a set of written data (DATA-H) to the LD 1 (12) (step 4003), but the LD 1 (12) is managed by the other SVC (in this case, it is the SVC 1 (10) that manages the LD 1 (12)). In this case, the SVC 2 (20) needs to notify the owner (i.e., SVC 1 (10)) of the host write request and inquire of the SVC 1 (10) about address information including the associated information on "the action of writing the written data (DATA-H) to the LD 1 (12)", because the SVC 2 (20) that receives the host write request, is not the owner of the LD 1 (12) (step 4005). In an embodiment of the present invention, the specific implementation of such an inquiry may be that the CPC 2 (205)

of the SVC 2 (20) sends an inquiry command (CMD-SC2 command) to the SVC 1 (10) through the ICC that is established by the RCC interconnect controller (9), wherein the inquiry command inquires of the SVC 1 (10) about which one or more storage spaces that are represented by the one or more data storage addresses of the buffer 1 (1071) of the memory 1 (107), are going to be used to store the written data (DATA-H) that are associated with the host write request (step 4005). After the SVC 1 (10) receives the inquiry command (CMD-SC2 command), the SVC 1 (10) will assign a storage space in the buffer 1 (1071), which may correspond to one or more data storage addresses (for example, ADDR 1), for temporarily storing the written data (DATA-H) associated with the host write request, and then will reply the corresponding one or more data storage addresses (for example, ADDR 1) to the SVC 2 (20) (step 4007). The CPC 2 (205) of the SVC 2 (20) will look up, according to the one or more data storage addresses (for example, ADDR 1), the MT 2 (2031) stored in the switch 2 (203) to find out one or more virtual multicast addresses (virtual multicast ADDR), which correspond to the one or more data storage addresses (for example, ADDR 1) (step 4009). Next, the CPC 2 (205) of the SVC 2 (20) will send the one or more virtual multicast addresses (virtual multicast ADDR) to the host-side I/O controller 2 (201) of the SVC 2 (20) (step 4011) in order to allow the host-side I/O controller 2 (201) to attach, upon receipt of the written data (DATA-H) from the host (15), the one or more virtual multicast addresses (virtual multicast ADDR) to the written data (DATA-H), so that the switch 2 (203) which subsequently receives the written data (DATA-H), will know that the written data (DATA-H) attached with the one or more virtual multicast addresses (virtual multicast ADDR) need to be simultaneously written to the assigned locations in both of the buffer 1 (1071) and the buffer 2 (2071). Afterwards, the CPC 2 (205) issues a message to the host (15) to inform the host (15) that it is alright to start sending the written data (DATA-H) to the SVC 2 (20) (step 4013). Next, the process goes to the node C (step 4015), the subsequent steps of which are shown in FIG. 4B.

Please refer to FIG. 4B and FIG. 5B at the same time. Following above-mentioned step 4013, the process goes to steps 4027 to 4043 in FIG. 4B through the node C, so as to execute the second part of the flowchart of the second embodiment shown in FIG. 4B, while FIG. 5B shows the schematic diagram of the signal transmission thereof. When the host (15) is notified that the transmission of the written data (DATA-H) is permitted, the host (15) will send the written data (DATA-H) to the SVC 2 (20), and the written data (DATA-H) will be received by the host-side I/O controller 2 (201) (step 4027). When the SVC 2 (20) receives the written data (DATA-H), the host-side I/O controller 2 (201) of the SVC 2 (20) will attach the one or more virtual multicast addresses (virtual multicast ADDR) received from the CPC 2 (205), to the written data (DATA-H), thus forming a set of "written data (DATA-H) attached with the virtual multicast ADDR", and then will transmit the "written data (DATA-H) attached with the virtual multicast ADDR" to the switch 2 (203) of the SVC 2 (20) (step 4029). After receiving the "written data (DATA-H) attached with the virtual multicast ADDR", the switch 2 (203) will identify the one or more virtual multicast ADDR and will look up the multicast table (MT 2) (2031) according to the one or more virtual multicast addresses (virtual multicast ADDR) in order to ensure the destinations, to which the "written data (DATA-H) attached with the virtual multicast ADDR" are going to be written, and then the switch (203) will multicast the written data (DATA-H) to the buffer 1 (1071) of the SVC 1 (10) and to the buffer 2 (2071) of the SVC 2 (20) according to both the data storage addresses (ADDR 1 and ADDR 2) of the buffer 1 (1071) and the buffer 2 (2071) (step 4031). During the process of multicasting, the CPC 2 (205) of the SVC 2 (20) will keep checking and determining whether or not the written data (DATA-H) have been successfully written to the destinations that are associated with the data storage addresses (ADDR 1) of the buffer 1 (1071) of the SVC 1 (10) and associated with the data storage addresses (ADDR 2) of the buffer 2 (2071) of the SVC 2 (20) (step 4033), until it is determined that the written data (DATA-H) have been successfully written to the two buffers (1071, 2071) of the two SVCs (10, 20). Then, the process goes to the next step.

When it is determined in step 4033 that the written data (DATA-H) have been successfully written to the two buffers (1071, 2071), the SVC 2 (20) that receives the written data (DATA-H) may transmit the necessary operating status information to the other SVC (i.e., the SVC 1 (10)) which cooperates with the SVC 2 (20) to form the SVC pair. Such action of transmitting the operating status information is achieved through the ICC established between the two SVCs (10, 20) by the RCC interconnect controller (9). The action of transmitting the operating status information comprises one step of informing, by the CPC 2 (205) of the SVC 2 (20), the CPC 1 (105) of the SVC 1 (10) that the written data (DATA-H) have been successfully written to the buffer 1 (1071) according to the data storage addresses (ADDR 1) of the buffer 1 (1071) of the SVC 1 (10) and written to the buffer 2 (2071) according to the data storage address (ADDR 2) of the buffer 2 (2071) of the SVC 2 (20) (step 4035), so that the CPC 1 (105) of the SVC 1 (10) will know that the written data (DATA-H) have been successfully written to the buffer 1 (1071) according to the assigned data storage addresses (ADDR 1) of the buffer 1 (1071). Afterwards, the CPC 1 (105) of the SVC 1 (10) may proceed with the subsequent steps; one of the examples is writing the written data (DATA-H) to the LD 1 (12). In addition, through being informed by the CPC 2 (205) of the SVC 2 (20), the CPC 1 (105) of the SVC 1 (10) will know that there is a set of back-up data stored in the SVC 2 (20), which is identical to the written data (DATA-H).

When the CPC 1 (105) of the SVC 1 (10) knows that the written data (DATA-H) have been written to the buffer 1 (1071) according to the data storage addresses (ADDR 1), the CPC 1 (105) of the SVC 1 (10) will send, through the ICC that is established by the RCC interconnect controller (9), a confirmation message (write completion notification) to the CPC 2 (205) of the SVC 2 (20), so that the CPC 2 (205) of the SVC 2 (20) will know that the written data (DATA-H) have been successfully written to the buffer 1 (1071) according to the data storage addresses (ADDR 1) of the buffer 1 (1071) of the SVC 1 (10) (step 4037).

Then, after the CPC 2 (205) of the SVC 2 (20) receives the write completion notification from the CPC 1 (105) of the SVC 1 (10) (i.e., after the step 4037), the CPC 2 (205) of the SVC 2 (20) will notify the host (15) that the host write request previously issued by the host (15) is completed (step 4039).

On the other hand, after the written data (DATA-H) have been successfully written to the buffer 1 (1071) according to the data storage addresses (ADDR 1) of the buffer 1 (1071), the CPC 1 (105) of the SVC 1 (10) may start writing the written data (DATA-H) temporarily stored in the buffer 1 (1071), to the LD 1 (12) (step 4041). Such a writing process may be a background procedure. Moreover, the SVC 1 (10)

will keep checking and determining whether or not the written data (DATA-H) have been successfully written to the LD 1 (12) until it is determined that the writing process is completed (step 4043).

Please refer to FIG. 4A and FIG. 5C at the same time. FIG. 4A takes the data storage system architecture (1) as an example to illustrate the first part of the flowchart of the second embodiment of the present invention. FIG. 5C shows the schematic diagram of the signal transmission from step 4001 to step 4003 and from step 4017 to step 4023 in FIG. 4A according to the data storage system architecture (1) of the present invention. For example, when the host (15) intends to write a set of written data (DATA-H) to the LD 1 (12), the host (15) will issue a host write request to the RAID subsystem (3), and the host write request may be issued to any one of the SVCs in the RAID subsystem (3). In this example, it is assumed that the owner of the LD 1 (12) is the SVC 1 (10). When one SVC (for example, the SVC 1 (10) or the SVC 2 (20)) in the SVC pair of the RAID subsystem (3), receives the host write request (step 4001), the receiving SVC (for example, the SVC 1 (10) or the SVC 2 (20)) that receives the host write request will determine, through the information carried by the host write request, which one of the LDs (in this case, it is the LD 1 (12)) the host (15) intends to write the written data (DATA-H) to, and accordingly will know whether or not the receiving SVC itself has the ownership over the LD (i.e., the LD 1 (12)), to which the written data (DATA-H) associated with the host write request are going to be written (step 4003).

One determination result of above step 4003 may be that the host write request is received by the owner SVC (in this case, it is the SVC 1 (10) that receives the host write request); in other words, the SVC 1 (10) receives the host write request which asks to write a set of written data (DATA-H) to the LD 1 (12) managed by the SVC 1 (10) itself (step 4003). In this case, because the SVC 1 (10) that receives the host write request, is the owner of the LD 1 (12), the SVC 1 (10) itself can determine which one or more storage spaces that are represented by the one or more data storage addresses of the buffer 1 (1071), are assigned to temporarily store the written data (DATA-H) that are associated with the host write request (step 4017). The CPC 1 (105) of the SVC 1 (10) will look up, according to the one or more data storage addresses (ADDR 1), the MT 1 (1031) stored in the switch 1 (103) in order to find out one or more virtual multicast addresses (virtual multicast ADDR) which correspond to the one or more data storage addresses (ADDR 1) (step 4019). Next, the CPC 1 (105) of the SVC 1 (10) will transmit the one or more virtual multicast addresses (virtual multicast ADDR) to the host-side I/O controller 1 (101) of the SVC 1 (10) (step 4021) in order to allow the host-side I/O controller 1 (101) to attach, upon receipt of the written data (DATA-H) from the host (15), the one or more virtual multicast addresses (virtual multicast ADDR) to the written data (DATA-H), so that the switch 1 (103) which subsequently receives the written data, will know that the written data (DATA-H) attached with the one or more virtual multicast addresses (virtual multicast ADDR) need to be simultaneously written to the assigned locations in both of the buffer 1 (1071) and the buffer 2 (2071). Afterwards, the CPC 1 (105) issues a message to the host (15) to inform the host (15) that it is alright to start sending the written data (DATA-H) to the SVC 1 (10) (step 4023). Next, the process goes to the node D (step 4025), the subsequent steps of which are shown in FIG. 4C.

Please refer to FIG. 4C and FIG. 5D at the same time. Following above step 4023, the process goes to step 4045 to step 4061 in FIG. 4C through the Node D (step 4025) in order to execute the third part of the flowchart of the second embodiment shown in FIG. 4C, while FIG. 5D shows the schematic diagram of associated signal transmission. When the host (15) is notified that the transmission of the written data (DATA-H) is permitted, the host (15) will transmit the written data (DATA-H) to the SVC 1 (10), and the written data (DATA-H) will be received by the host-side I/O controller 1 (101) of the SVC 1 (10) (step 4045). When the SVC 1 (10) receives the written data (DATA-H), the host-side I/O controller 1 (101) of the SVC 1 (10) will attach the one or more virtual multicast addresses (virtual multicast ADDR) to the written data (DATA-H), thus forming a set of "written data (DATA-H) attached with the virtual multicast ADDR", and then will transmit the "written data (DATA-H) attached with the virtual multicast ADDR" to the switch 1 (103) of the SVC 1 (10) (step 4047). After receiving the "written data (DATA-H) attached with the virtual multicast ADDR", the switch 1 (103) will identify the one or more virtual multicast ADDR and will look up the MT 1 (1031) according to the one or more virtual multicast ADDR, in order to ensure the destinations, to which the "written data (DATA-H) attached with the virtual multicast ADDR" are going to be written, and then the switch 1 (103) will multicast the written data (DATA-H) to the buffer 1 (1071) of the SVC 1 (10) and to the buffer 2 (2071) of the SVC 2 (20) according to both the data storage addresses ADDR 1 and ADDR 2 of the buffer 1 (1071) and the buffer 2 (2071) (step 4049). During the process of the multicasting, the CPC 1 (105) of the SVC 1 (10) will keep checking and determining whether or not the written data (DATA-H) have been successfully written to the destinations that are associated with the data storage addresses (ADDR 1) of the buffer (1071) of the SVC 1 (10) and associated with the data storage addresses (ADDR 2) of the buffer 2 (2071) of the SVC 2 (20) (step 4051), until it is determined that the written data (DATA-H) have been successfully written to the two buffers (1071, 2071) of the two SVCs (10, 20). Then, the process goes to the next step.

When it is determined in step 4051 that the written data (DATA-H) have been successfully written to the two buffers (1071, 2071), the SVC 1 (10) that receives the host written data (DATA-H) may transmit the necessary operating status information to the other SVC (i.e., the SVC 2 (20)) that cooperates with the SVC 1 (10) to form the SVC pair. Such action of transmitting the operating status information is achieved through the ICC established by the RCC interconnect controller (9) between the two SVCs (SVC 1 and SVC 2) (10, 20). The action of transmitting the operating status information comprises one step of informing, by the CPC 1 (105) of the SVC 1 (10), the CPC 2 (205) of the SVC 2 (20) that the written data (DATA-H) have been successfully written to the buffer 2 (2071) according to the data storage address (ADDR 2) of the buffer 2 (2071) of the SVC 2 (20) (step 4053). In this way, the CPC 2 (205) of the SVC 2 (20) can know that the written data (DATA-H) have been written to the SVC 2 (20) at the data storage addresses (ADDR 2) of the buffer 2 (2071) for reconfirmation and the subsequent processing. When the CPC 2 (205) of the SVC 2 (20) confirms that the written data (DATA-H) have been successfully written to the data storage addresses (ADDR 2) of the buffer 2 (2071) of the SVC 2 (20), the CPC 2 (205) of the SVC (20) will transmit a confirmation message (write completion notification) to the CPC 1 (105) of the SVC 1 (10) through the ICC that is established by the RCC interconnect controller (9). In this way, the CPC 1 (105) of the SVC 1 (10) will know that the written data (DATA-H) have been successfully written to the buffer 2 (2071) according to the data storage addresses (ADDR 2) of the buffer 2 (2071) of the SVC 2 (20) (step 4055).

Next, after the CPC 1 (105) of the SVC 1 (10) receives the confirmation message (the write completion notification) from the CPC 2 (205) of the SVC 2 (20) (i.e., after step 4055), the CPC 1 (105) of the SVC 1 (10) will notify the host (15) that the host write request previously issued by the host (15), is completed (step 4057).

On the other hand, after the written data (DATA-H) have been successfully written to the buffer 1 (1071) according to the data storage addresses (ADDR 1) of the buffer 1 (1071), the CPC 1 (105) of the SVC 1 (10) may start writing the written data (DATA-H) temporarily stored in the buffer 1 (1071), to the LD 1 (12) (step 4059). Such a writing process may be a background procedure. Moreover, the CPC 1 (105) of the SVC 1 (10) will keep checking and determining whether or not the written data (DATA-H) have been successfully written to the LD 1 (12) until it is determined that the written data (DATA-H) have been successfully written to the LD 1 (12) (step 4061).

Please refer to FIG. 6. FIG. 6 shows a schematic diagram of the data structure of multicast tables (MTs) (for example, the MT 1 (1031) and the MT 2 (2031)) for executing the data access method shown in FIG. 2A to FIG. 2C and FIG. 4A to FIG. 4C according to the data storage system architecture (1) of the present invention. Basically, the data structures of the MT 1 (1031) and the MT 2 (2031) are the same. In an embodiment of the present invention, there are three fields: the virtual multicast addresses (virtual multicast ADDR), the data storage addresses (ADDR 1) of the buffer 1 (1071), and the data storage addresses (ADDR 2) of the buffer 2 (2071), where each virtual multicast address (virtual multicast ADDR) in entries corresponds to one associated data storage address (ADDR 1) of the buffer 1 (1071), and to one associated data storage address (ADDR 2) of the buffer 2 (2071). The virtual multicast addresses (virtual multicast ADDR), reserved by the data storage system architecture 1, are a group of virtual data addresses represented in a unique way. The virtual multicast addresses (virtual multicast ADDR) do not indicate any physical memory address, but are used to help the SVC 1 (10) and the SVC 2 (20) to recognize whether or not to execute the multicasting function on the written data (DATA-H) associated with the write request. In addition, each virtual multicast address (virtual multicast ADDR) carries an important task: to provide associated corresponding relationships between the data storage address (ADDR 1) of the buffer 1 (1071) and the data storage address (ADDR 2) of the buffer 2 (2071). Therefore, when one of the SVCs (SVC 1, SVC 2) (10, 20) recognizes the virtual multicast addresses (virtual multicast ADDR) from the received written data (DATA-H), the receiving SVC will know that a multicasting function needs to be performed on the written data (DATA-H), and the destinations of the multicasting are the associated data storage addresses (ADDR 1) of the buffer 1 (1071) and the associated data storage addresses (ADDR 2) of the buffer 2 (2071). According to the embodiment shown in FIG. 6, it illustrates that, when the multicasting function is set up, the addresses of 0000000~00FFFF in the buffer 1 (1071) are reserved as the data storage addresses (ADDR 1), while the addresses of 0000000~00FFFF in the buffer 2 (2071) are also reserved as the data storage addresses (ADDR 2). FIG. 6 also illustrates, through taking the first entry as an example, the virtual multicast address (virtual multicast ADDR) "FF0000" is associated with the reserved address "000000" in the buffer 1 (1071) and is associated with the reserved address "000000" in the buffer 2 (2071).

Please refer to FIG. 2A to FIG. 2B, FIG. 4A to FIG. 4B, and FIG. 6. In an embodiment of the present invention, when the non-owner SVC (as shown in the figures, it is the SVC 2 (20)) receives a write request from the host (15), as a non-owner, the CPC 2 (205) of the SVC 2 (20) will inquire of the CPC 1 (105) of the SVC 1 (10) that is the owner (step 2005) in order to obtain the one or more associated data storage addresses (ADDR 1) (step 2007). After the non-owner SVC 2 (20) obtains the one or more associated data storage addresses (ADDR 1) from the owner SVC 1 (10), the non-owner SVC 2 (20) will look up its own MT 2 (2031) according to the one or more associated data storage addresses (ADDR 1), in order to find out the one or more virtual multicast addresses (virtual multicast ADDR) which correspond to the one or more data storage addresses (ADDR 1) (step 2009). Then, the non-owner SVC 2 (20) will attach the one or more virtual multicast addresses (virtual multicast ADDR) to the written data (DATA-H) associated with the host write request, and will determine, upon receipt of the written data (DATA-H) attached with the virtual multicast addresses (virtual multicast ADDR), the associated two data storage addresses (ADDR 1, ADDR 2), according to both of which, the written data (DATA-H) will be respectively written to the buffer 1 (1071) and to the buffer 2 (2071), when performing the multicasting function.

Please refer to FIG. 2A and FIG. 2C, FIG. 4A to FIG. 4C, and FIG. 6. In another embodiment of the present invention, when the owner SVC (as shown in the figures, it is the SVC 1 (10)) receives a write request from the host (15), because the SVC 1 (10) itself is the owner of the target LD (as the example shown in the figures, the LD 1 (12)), the SVC 1 (10) will assign one or more associated data storage addresses (ADDR 1) used for temporarily storing the written data (DATA-H) (step 2017). Next, the SVC 1 (10) that is the owner, looks up its own MT 1 (1031) according to the one or more associated data storage addresses (ADDR 1) in order to find out the one or more virtual multicast addresses (virtual multicast ADDR) that correspond to the one or more associated data storage addresses (ADDR 1) (step 2019). Then, the SVC 1 (10) that is the owner will attach the one or more virtual multicast addresses (virtual multicast ADDR) to the written data (DATA-H) associated with the host write request, and will determine, upon receipt of the written data (DATA-H) attached with the virtual multicast addresses (virtual multicast ADDR), the associated two data storage addresses (ADDR 1, ADDR 2), according to both of which, the written data (DATA-H) will be written to the buffer 1 (1071) and to the buffer 2 (2071), when performing the multicasting function.

In conclusion, the multicasting mechanism of the data access method of the present invention provides a more efficient function to the data storage system architecture with a redundant SVC pair while processing write requests. Especially, when the host issues a write request to an SVC without the ownership, the non-owner SVC still can quickly complete the work about data synchronization between two SVCs by the multicasting mechanism. Such work about data synchronization will not only prevent the loss of data temporarily stored in one of the redundant SVC pair due to a failure occurred in the one SVC when the one SVC is processing the write request, but also reduce the burden derived from denied access when the non-owner SVC receives the write request but denies the write request, and also reduce the extra time required to backup the written data (DATA-H) to the other SVC of the redundant SVC pair. Therefore, the multicasting mechanism of the data access method of the present invention not only solves the aforesaid problems but also provides a reliable and fast data access method.

Figure 7:
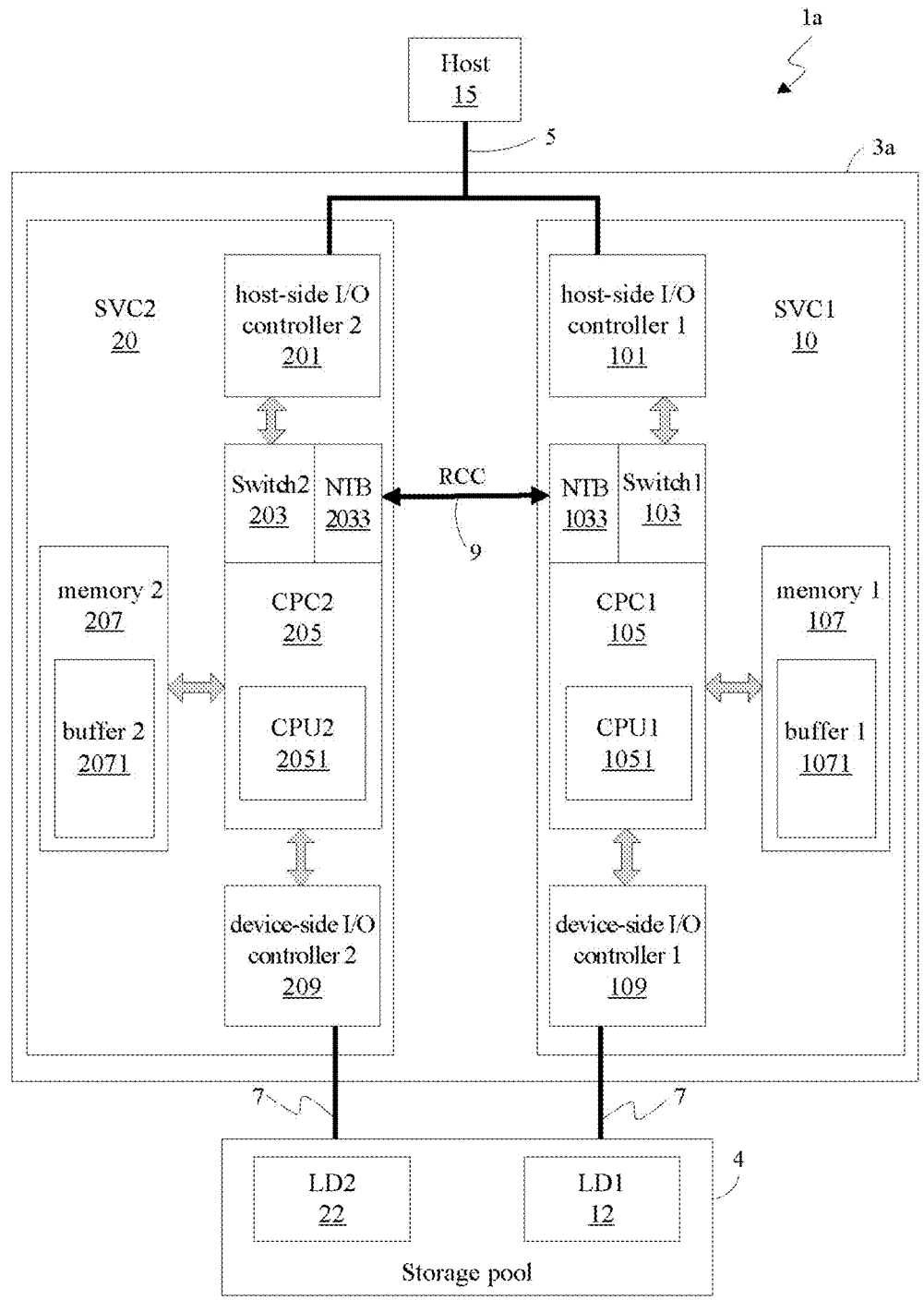
FIG. 7 shows a schematic diagram of a data storage system architecture 1a according to an embodiment of the present invention.

Please refer to FIG. 7 which is a schematic diagram that shows a data storage system architecture (1a) (hereinafter called "storage system architecture") according to another embodiment of the present invention. The storage system architecture (1a) comprises a host (15), and a redundant array of independent disks subsystem (RAID subsystem) (3a). Comparing the storage system architecture (1a) shown in FIG. 7 to the storage system architecture (1) shown in FIG. 1, the switch 1 (103) and the switch 2 (203) are respectively integrated into the CPC 1 (105) and the CPC 2 (205), together forming a single device/circuit system/component. In addition, FIG. 7 also shows that the switch 1 (103) and the switch 2 (203) are respectively connected to the RCC interconnect controller (9) by ports with the NTB function (1033, 2033). In this way, through the channel formed by the switch 1 (103), the switch 2 (203), and the RCC interconnect controller (9), the SVC 1 (10) and the SVC 2 (20) are able to transmit messages and data to each other. As mentioned before, the NTB function (1033, 2033) can not only be integrated into the switch 1 (103) and the switch 2 (203), but also be implemented as an independent module that separates from the switches (for example, the switch 1 (103) and the NTB 1 (1033), the switch 2 (203) and the NTB 2 (2033)). In addition, the functions and roles of the components in the storage system architecture (1a) are the same as those of the components in the storage system architecture (1) in FIG. 1, thus the detailed description of which will not be repeated.

Figure 8A:
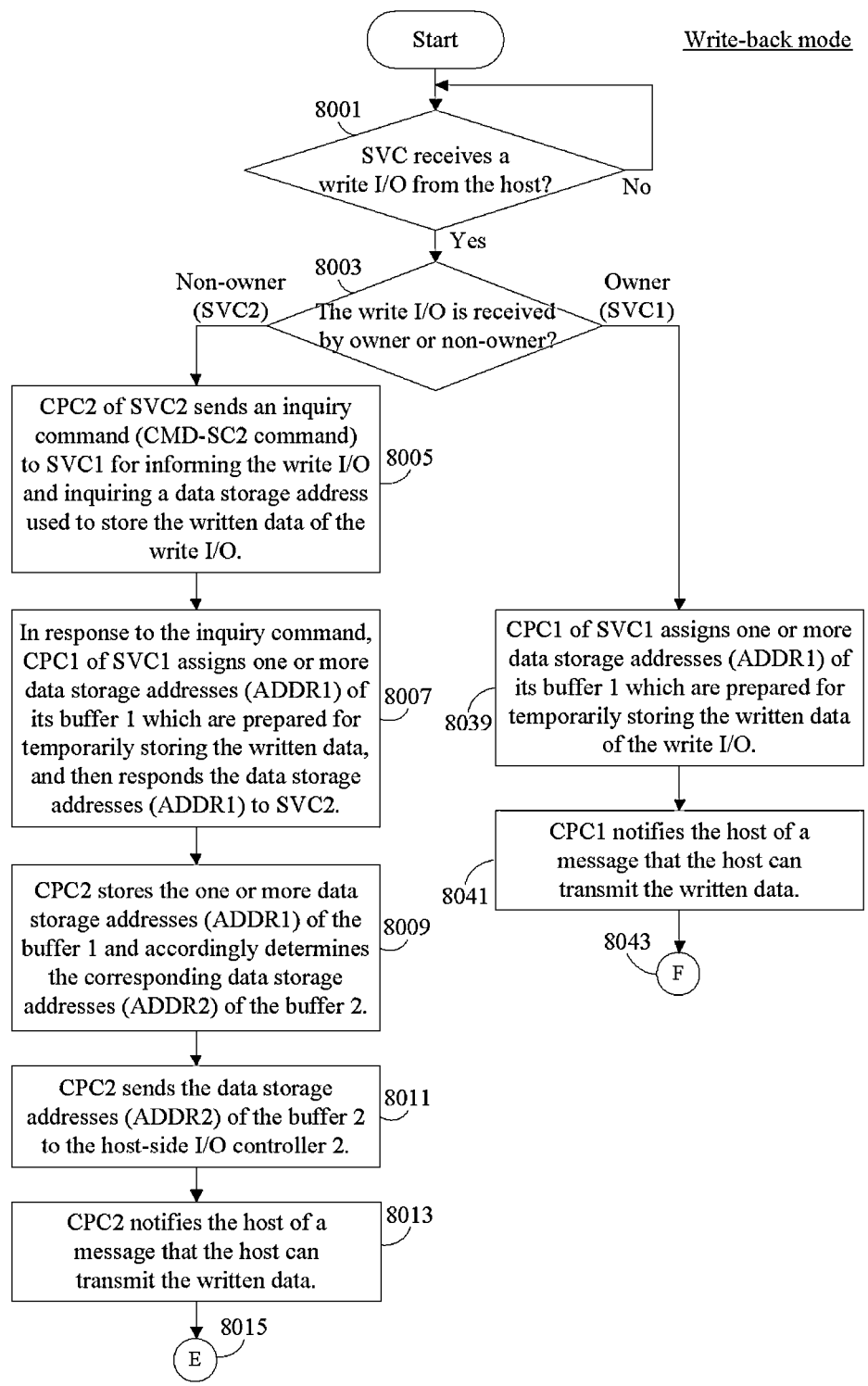
FIG. 8A shows the first part of the flowchart of the third embodiment for executing, under the write back mode, a data access method according to the data storage system architecture 1 or 1a of the present invention.
Figure 8B:
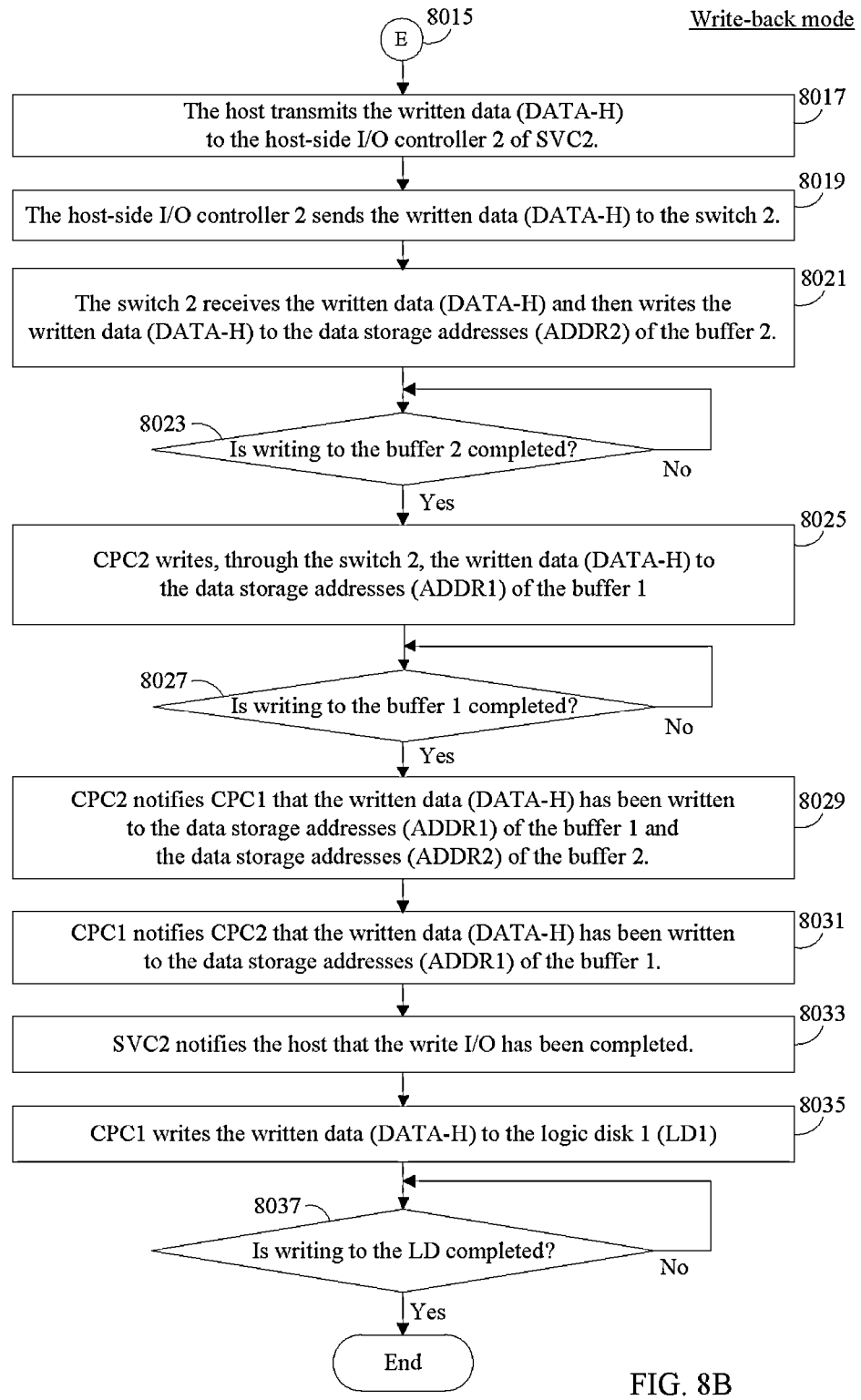
FIG. 8B shows the second part of the flowchart of the third embodiment for executing, under the write back mode, the data access method according to the data storage system architecture 1 or 1a of the present invention.
Figure 8C:
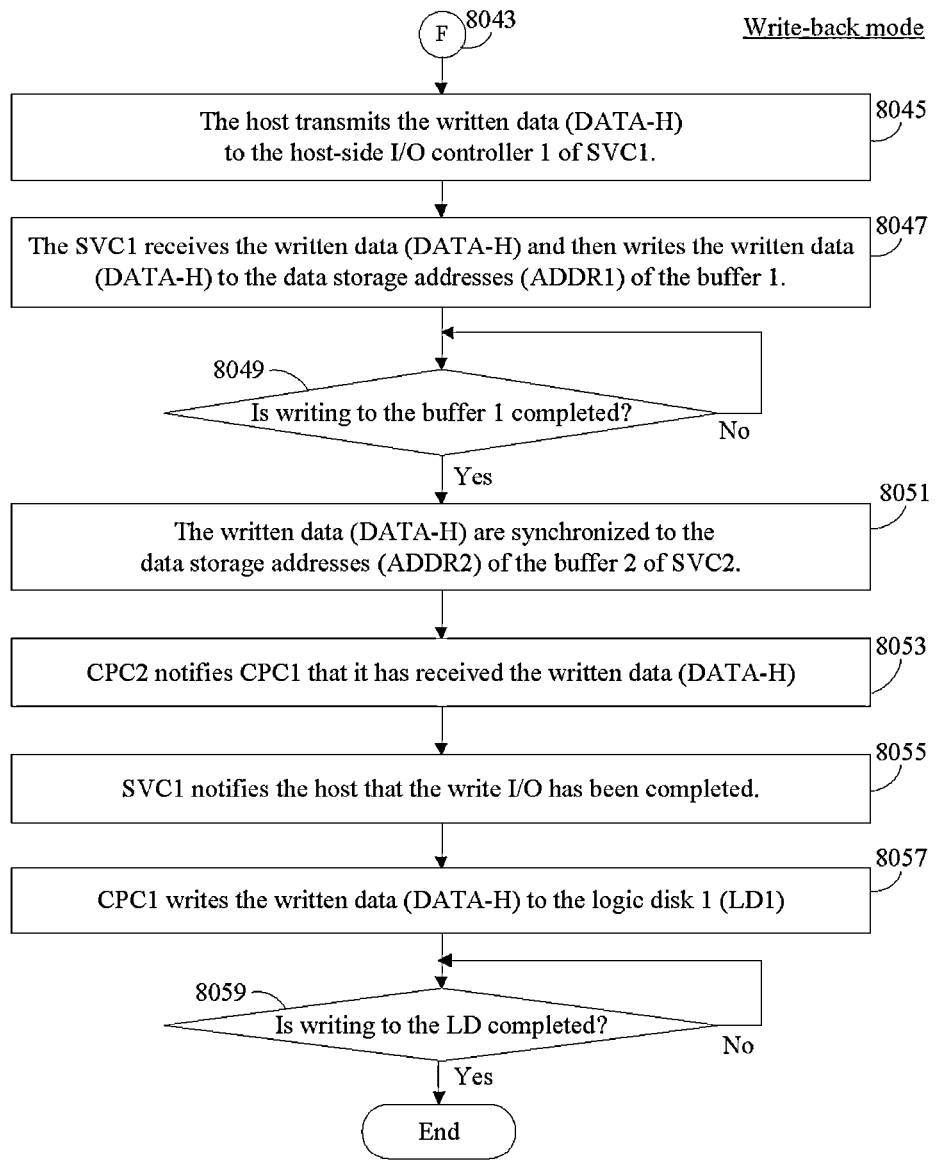
FIG. 8C shows the third part of the flowchart of the third embodiment for executing, under the write back mode, the data access method according to the data storage system architecture 1 or 1a of the present invention.

Please refer to FIG. 8A to FIG. 8C. FIG. 8A shows the first part of the flowchart of the third embodiment for executing, under the write back mode, a data access method according to the data storage system architecture (1a). FIG. 8B shows the second part of the flowchart of the third embodiment for executing, under the write back mode, the data access method according to the data storage system architecture (1a). FIG. 8C shows the third part of the flowchart of the third embodiment for executing, under the write back mode, the data access method according to the data storage system architecture (1a).

Please refer to FIG. 8A. When the host (15) intends to write a set of written data (DATA-H) to the LD 1 (12) of the RAID subsystem (3a), the host (15) will issue a host write request to the RAID subsystem (3a), and the write request may be sent to any one of the SVCs in the RAID subsystem (3a). In this example, it is assumed that the owner of the LD 1 (12) is the SVC 1 (10). When one SVC (for example, the SVC 1 (10) or the SVC 2 (20)) in the RAID subsystem (3a) receives the host write request (step 8001), the receiving SVC (for example, the SVC 1 (10) or the SVC 2 (20)) that receives the host write request will determine, through the information carried by the host write request, which one of the LDs (in this case, it is the LD 1 (12)) the host (15) intends to write the written data (DATA-H) to, and accordingly will know whether or not the receiving SVC itself has the ownership over the LD (i.e., the LD 1 (12)), to which the written data (DATA-H) associated with the host write request is going to be written (step 8003).

One determination result of above step 8003 may be that the host write request is received by a non-owner SVC (in this case, it is the SVC 2 (20) that receives the host write request); in other words, the SVC 2 (20) receives the host write request which asks to write a set of written data (DATA-H) to the LD 1 (12) (step 8003), but the LD 1 (12) is managed by the other SVC (in this case, it is the SVC 1 (10) that manages the LD 1 (12)). In this case, the SVC 2 (20) needs to notify the owner (i.e., SVC 1 (10)) of the LD 1 (12) about the host write request and inquire of the SVC 1 (10) about address information including the information related to "the action of writing the written data (DATA-H) to the LD 1 (12)" (step 8005), because the SVC 2 (20) that receives the host write request, is not the owner of the LD 1 (12). In an embodiment of the present invention, the specific implementation of such an inquiry may be that the CPC 2 (205) of the SVC 2 (20) sends an inquiry command (CMD-SC2 command) to the SVC 1 (10) through the ICC that is established by the RCC interconnect controller (9), wherein the inquiry command inquires of the SVC 1 (10) about which one or more storage spaces that are represented by one or more data storage addresses of the buffer 1 (1071) of the memory 1 (107), are going to be used to store the written data (DATA-H) that is associated with the host write request (step 8005). After receiving the inquiry command (CMD-SC2 command), the SVC 1 (10) will assign a storage space in the buffer 1 (1071), which may correspond to one or more data storage addresses (for example, ADDR 1), for temporarily storing the written data (DATA-H) associated with the host write request, and then will reply the corresponding one or more data storage addresses (for example, ADDR 1) to the SVC 2 (20) (step 8007). The CPC 2 (205) of the SVC 2 (20) will store the one or more data storage addresses (for example, ADDR 1) replied by the SVC 1 (10) and accordingly will find one or more data storage addresses (for example, ADDR 2) of the buffer 2 (2071) of the memory 2 (207) that correspond to the one or more data storage addresses (for example, ADDR 1) (step 8009). Next, the CPC 2 (205) of the SVC 2 (20) will first send the one or more data storage addresses (for example, ADDR 2) to the host-side I/O controller 2 (201) of the SVC 2 (20) (step 8011) in order to allow the host-side I/O controller 2 (201) to store, upon receipt of the written data (DATA-H) from the host (15), the written data (DATA-H) to the one or more data storage addresses (for example, ADDR 2) of the buffer 2 (2071). Afterwards, the CPC 2 (205) issues a message to the host (15) to notify the host (15) that it is alright to start sending the written data (DATA-H) to the SVC 2 (20) (step 8013). Then, the process goes to the node E (step 8015), the subsequent steps of which are shown in FIG. 8B.

Please refer to FIG. 8B. Following above-mentioned step 8013, the process goes to steps 8017 to 8037 in FIG. 8B through the node E, so as to execute the second part of the flowchart of the third embodiment shown in FIG. 8B. When the host (15) is notified that the transmission of the written data (DATA-H) is permitted, the host (15) will send the written data (DATA-H) to the SVC 2 (20), and the written data (DATA-H) will be received by the host-side I/O controller 2 (201) (step 8017). When receiving the written data (DATA-H), the host-side I/O controller 2 (201) will attach the one or more data storage addresses (for example, ADDR 2) to the written data (DATA-H) and then will transmit the "written data (DATA-H) attached with the one or more data storage addresses (for example, ADDR 2)" to the switch 2 (203) of the SVC 2 (20) (step 8019). After receiving the "written data (DATA-H) attached with the data storage addresses (for example, ADDR 2)", the switch 2 (203) will write the written data (DATA-H) to the one or more data storage addresses (for example, ADDR 2) of the buffer 2 (2071) (step 8021). During the process of writing, the CPC 2 (205) of the SVC 2 (20) keeps checking and determining whether or not the written data (DATA-H) has been successfully written to the one or more data storage addresses (for example, ADDR 2) of the buffer 2 (2071) of the SVC 2 (20) (step 8023) until it is determined that the written data (DATA-H) has been successfully written to the buffer 2 (2071) of the SVC 2 (20). Then, the process goes to the next step.

When it is determined in step 8023 that all the written data (DATA-H) has been successfully written to the one or more data storage addresses (for example, ADDR 2) of the buffer 2 (2071), the SVC 2 (20) that receives the written data (DATA-H) will write the written data (DATA-H) to the buffer 1 (1071) of the SVC 1 (10) according to the previously received one or more data storage addresses (for example, ADDR 1) of the buffer 1 (1071) (step 8025). Such action of writing is achieved through the ICC jointly established by the RCC interconnect controller (9), the switch 2 (203), and the switch 1 (103) between the two SVCs (10, 20). During the process of writing, the CPC 2 (205) of the SVC 2 (20) keeps checking and determining whether or not the written data (DATA-H) has been successfully written to the one or more data storage addresses (for example, ADDR 1) of the buffer 1 (1071) of the SVC 1 (10) (step 8027) until it is determined that all the written data (DATA-H) has been successfully written to the buffer 1 (1071) of the SVC 1 (10). Afterwards, the CPC 2 (205) of the SVC 2 (20) will inform the CPC 1 (105) of the SVC 1 (10) that the written data have been successfully written to the one or more data storage addresses (for example, ADDR 1) of the buffer 1 (1071) of the SVC 1 (10) and written to the one or more data storage addresses (for example, ADDR 2) of the buffer 2 (2071) of the SVC 2 (20) (step 8029). In this way, the CPC 1 (105) of the SVC 1 (10) can determine that the written data have been successfully written to the assigned data storage addresses (for example, ADDR 1) of the buffer 1 (1071). Then, the CPC 1 (105) of the SVC 1 (10) may proceed with the subsequent steps; for example, writing the written data (DATA-H) to the LD 1 (12).

When the CPC 1 (105) of the SVC 1 (10) receives a write completion notification sent by the CPC 2 (205) of the SVC 2 (20), the CPC 1 (105) of the SVC 1 (10) will transmit a confirmation message (indicating that the written data is received) to the CPC 2 (205) of the SVC 2 (20) through the ICC established by the RCC interconnect controller (9), so that the CPC 2 (205) of the SVC 2 (20) will know that the written data (DATA-H) has been successfully written to the data storage addresses (for example, ADDR 1) of the buffer 1 (1071) of the SVC 1 (10) (step 8031).

Afterwards, after the CPC 2 (205) of the SVC 2 (20) receives the confirmation message from the CPC 1 (105) of the SVC 1 (10) (i.e., after step 8031), the CPC 2 (205) of the SVC 2 (20) will notify the host (15) that the host write request previously issued by the host (15), is completed (step 8033).

On the other hand, when the written data (DATA-H) has been written to the data storage addresses (for example, ADDR 1) of the buffer 1 (1071), the CPC 1 (105) of the SVC 1 (10) may start at any time writing the written data (DATA-H) temporarily stored in the buffer 1 (1071), to the LD 1 (12) (step 8035). Such a writing process may be a background procedure. Moreover, during the process of writing, the SVC 1 (10) will keep checking and determining whether or not the written data (DATA-H) has been successfully written to the LD 1 (12) until it is determined that all the written data (DATA-H) has been completely written (step 8037).

Please refer to FIG. 8A again, which takes the data storage system architecture (1a) as an example to illustrate step 8001 to step 8003 and step 8039 to step 8043 of the first part of the flowchart of the third embodiment of the present invention. According to an embodiment of the present invention, when the host (15) intends to write a set of written data (DATA-H) to the LD 1 (12), the host (15) will issue a host write request to the RAID subsystem (3), and the host write request may be issued to any one of the SVCs in the RAID subsystem (3). In this example, it is assumed that the owner of the LD 1 (12) is the SVC 1 (10). When one SVC (for example, the SVC 1 (10) or the SVC 2 (20)) in the RAID subsystem (3), receives the host write request (step 8001), the receiving SVC (for example, the SVC 1 (10) or the SVC 2 (20)) that receives the host write request will determine, through the information carried by the host write request, which one of the LDs (in this case, it is the LD 1 (12)) the host (15) intends to write the written data (DATA-H) to, and accordingly will know whether or not the receiving SVC itself has the ownership over the LD (i.e., the LD 1 (12)), to which the written data (DATA-H) associated with the host write request are going to be written (step 8003).

One determination result of above step 8003 may be that the host write request is received by the owner SVC (in this case, it is the SVC 1 (10) that receives the host write request); in other words, the SVC 1 (10) receives the host write request which asks to write a set of written data (DATA-H) to the LD 1 (12) managed by the SVC 1 (10) itself (step 8003). In this case, because the SVC 1 (10) that receives the host write request, is the owner of the LD 1 (12), the SVC 1 (10) itself can determine which one or more storage spaces that are represented by one or more data storage addresses (for example, ADDR 1) of the buffer 1 (1071), are assigned to temporarily store the written data (DATA-H) that is associated with the host write request (step 8039). Afterwards, the SVC 1 (10) will transmit a message to the host (15) to notify the host (15) that it is alright to start sending the written data (DATA-H) to the SVC 1 (10) (step 8041). Then, the process goes to the node F (step 8043), the subsequent steps of which are shown in FIG. 8C.

Please refer to FIG. 8C. Following above step 8041, the process goes to step 8043 to step 8065 in FIG. 8C through the node F (step 8043) in order to execute the third part of the flowchart of the third embodiment shown in FIG. 8C. When the host (15) is notified that the transmission of the written data (DATA-H) is permitted, the host (15) will transmit the written data (DATA-H) to the SVC 1 (10), and the written data (DATA-H) will be received by the host-side I/O controller 1 (101) of the SVC 1 (10) (step 8045). When receiving the written data (DATA-H), the SVC 1 (10) will write the written data (DATA-H) to the one or more data storage addresses (for example, ADDR 1) of the buffer 1 (1071) (step 8047). Such a writing process is achieved by the host-side I/O controller 1 (101) and the switch 1 (103). During the process of writing, the CPC 1 (105) of the SVC 1 (10) keeps checking and determining whether or not the written data (DATA-H) has been successfully written to the one or more data storage addresses (for example, ADDR 1) of the buffer 1 (1071) (step 8049) until it is determined that all the written data (DATA-H) has been successfully written to the buffer 1 (1071) of the SVC 1 (10). Then, the process goes to the next step.

When the determination result is "Yes" in step 8049, the SVC 1 (10) that receives the written data (DATA-H) must transmit the necessary operating status information to the other SVC (i.e., the SVC 2 (20)) which cooperates with the SVC 1 (10) to form the SVC pair. Such action of transmitting the operating status information is achieved through the ICC established by the RCC interconnect controller (9) between the two SVCs (10, 20). The action of transmitting the operating status information comprises steps of backing up the written data (DATA-H) to the data storage addresses (ADDR 2) of the buffer 2 (2071) and informing the CPC 2 (205) of the SVC 2 (20) that the written data (DATA-H) needs to be backed up to, or has been backed up to the corresponding data storage addresses (ADDR 2) of the buffer 2 (2071) (step 8051).

In above step 8051, there are two possible implementations to back up the written data (DATA-H) to the buffer 2 (2071) of the SVC (20). The first possible implementation is that through preset corresponding relationships, the CPC 1 (105) transmits the same written data (DATA-H) to the associated data storage addresses (for example, ADDR 2) of the buffer 2 of the SVC 2 (20), after the CPC 1 (105) of the SVC 1 (10) receives the written data (DATA-H) and successfully stores the written data (DATA-H) to the data storage addresses (for example, ADDR 1) of the buffer 1 (1071) of the SVC 1 (10). Then, the CPC 1 (105) informs the CPC 2 (205) that the written data (DATA-H) has been written to the associated data storage addresses (ADDR 2) of the buffer 2 (2071).

The second possible implementation of step 8051 is that the CPC 1 (105) informs the CPC 2 (205) of the SVC 2 (20) that there is a set of written data (DATA-H) that needs to be backed up and the set of written data (DATA-H) is located at the data storage addresses (ADDR 1) of the buffer 1 (1071) of the SVC 1 (10), after the CPC 1 (105) of the SVC 1 (10) receives the written data (DATA-H) and successfully stores the written data (DATA-H) to the data storage addresses (for example, ADDR 1) of the buffer 1 (1071) of the SVC 1 (10). Therefore, the CPC 2 (205) of the SVC 2 (20) will assign the data storage addresses (for example, ADDR 2) of the buffer 2 (2071) in order to store the written data (DATA-H). Then, the CPC 2 (205) of the SVC 2 (20) will retrieve the written data (DATA-H) from the data storage addresses (ADDR 1) of the buffer 1 (1071) of the SVC 1 (10), and write the written data (DATA-H) to the associated data storage addresses (for example, ADDR 2) of its buffer 2 (2071).

When the CPC 2 (205) of the SVC 2 (20) confirms that the written data (DATA-H) has been written to the data storage addresses (for example, ADDR 2) of the buffer 2 (2071), the CPC 2 (205) of the SVC 2 (20) will transmit, through the ICC that is established by the RCC interconnect controller (9), an acknowledgement message (write completion notification) to the CPC 1 (105) of the SVC 1 (10) in order to let the CPC 1 (105) of the SVC 1 (10) know that the written data (DATA-H) has been backed up to the buffer 2 (2071) of the SVC 2 (20) (step 8053).

Then, after the CPC 1 (105) of the SVC 1 (10) receives the acknowledgement message from the SVC 2 (20) (i.e., after step 8053), the CPC 1 (105) of the SVC 1 (10) will notify the host (15) that the host write request is completed (step 8055).

The method of replying to the host that the write request has been completed as soon as the data is stored in the memory of the SVC, is called the "write back mode". Under the write back mode, when the written data (DATA-H) has been written to the data storage addresses (for example, ADDR 1) of the buffer 1 (1071) (i.e. after it is determined "Yes" in step 8049), the CPC 1 (105) of the SVC 1 (10) may at any time start to write the written data (DATA-H) stored in the buffer 1 (1071), into the LD 1 (12) (step 8057). Such a writing process may be a background procedure. During the process of writing, the SVC 1 (10) will keep checking and determining whether or not the written data (DATA-H) has been successfully written to the LD 1 (12) until it is determined that all the written data (DATA-H) has been successfully written to the LD 1 (12) (step 8059).

In another embodiment of the present invention, it is also can be set that the written data (DATA-H) must be successfully written to the LD before replying to the host that the host write request (write I/O) is completed; this approach is called the "write through mode". If the embodiments shown in FIG. 8A to FIG. 8C are changed to operate in the write through mode, then step 8033 in FIG. 8B and step 8055 in FIG. 8C both must be moved to the end of the flowcharts. That is to say, after confirming that the writing to the logical disk (LD) is completed at step 8037 in FIG. 8B and at step 8059 in FIG. 8C, respectively, it is the time to reply to the host (15) that the host write request (write I/O) previously issued has been completed (step 8033, step 8055).

Figure 9A:
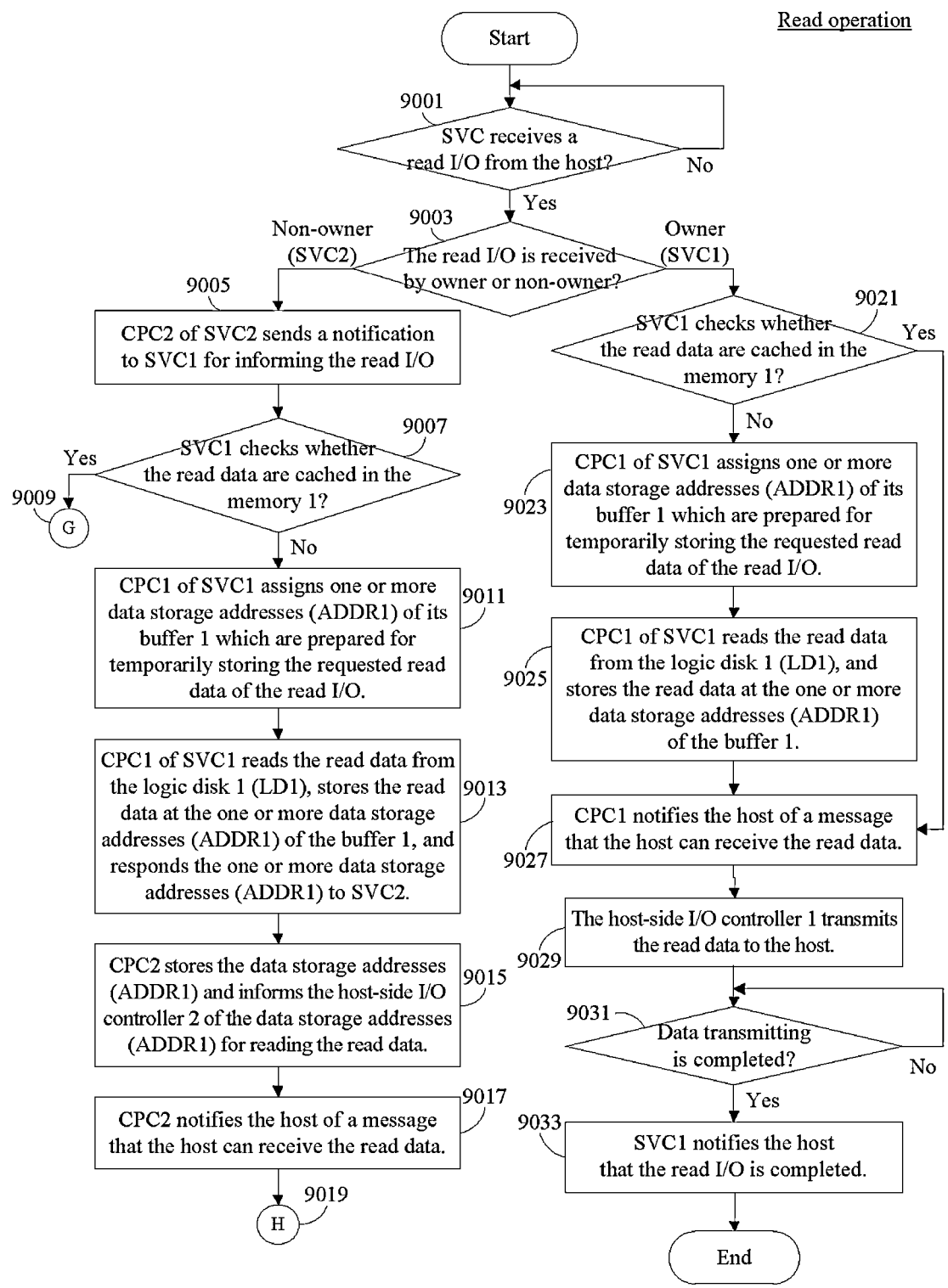
FIG. 9A shows the first part of the flowchart of the fourth embodiment for executing a data access method according to the data storage system architecture 1 or 1a of the present invention.
Figure 9B:
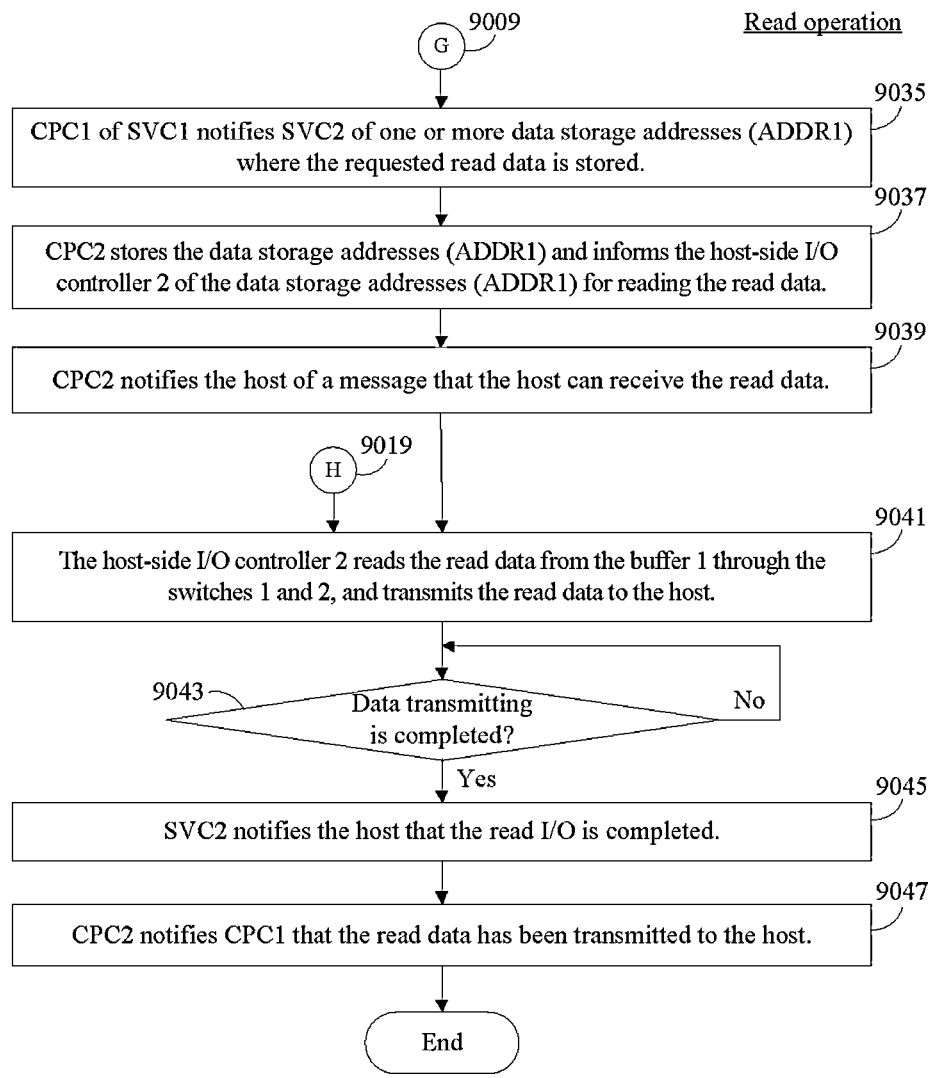
FIG. 9B shows the second part of the flowchart of the fourth embodiment for executing the data access method according to the data storage system architecture 1 or 1a of the present invention.

Please refer to FIG. 9A to FIG. 9B. FIG. 9A shows the first part of the flowchart of the fourth embodiment for executing a data access method according to the data storage system architecture (1) or (1*a*). FIG. 9B shows the second part of the flowchart of the fourth embodiment for executing the data access method according to the data storage system architecture (1) or (1*a*).

Please refer to FIG. 9A. When the host (15) intends to read a set of read data (DATA-H') from the LD 1 (12) in the RAID subsystem (3) or (3*a*), the host (15) will issue an I/O request (or called "host read request") to the RAID subsystem (3) or (3*a*). According to the present invention, the host read request will be issued to any one of the SVCs (10, 20) in the RAID subsystem (3) or (3*a*). In the following example, it is assumed that the owner of the LD 1 (12) is the SVC 1 (10). When one SVC (the SVC 1 (10) or the SVC 2 (20)) in the RAID subsystem (3) or (3*a*) receives the host read request from the host (15) (step 9001), the receiving SVC (the SVC 1 (10) or the SVC 2 (20)) that receives the host read request will determine, through the information carried by the host read request, which one of the LDs (in this case, it is the LD 1 (12)) the host (15) intends to read the read data (DATA-H') from, and accordingly will know whether or not the receiving SVC itself has the ownership over the LD (i.e., the LD 1 (12)) (step 9003).

One determination result of above step 9003 may be that the host read request is received by a non-owner SVC (in this case, it is the SVC 2 (20) that receives the host read request); in other words, the SVC 2 (20) receives the host read request which asks to read a set of read data (DATA-H') from the LD 1 (12) (step 9003), but the LD 1 (12) is managed by the other SVC (in this case, it is the SVC 1 (10) that manages the LD 1 (12)). In this case, the SVC 2 (20) needs to send a notification command to the owner (i.e., the SVC 1 (10)) of the LD 1 (12) to notify the SVC 1 (10) of the host read request and inquire of the SVC 1 (10) about address information including the information related to "the action of reading the read data (DATA-H') from the LD 1 (12)", because the SVC 2 (20) that receives the host read request, is not the owner of the LD 1 (12) (step 9005). In an embodiment of the present invention, the specific implementation of such an inquiry may be that the CPC 2 (205) of the SVC 2 (20) sends an inquiry command to the SVC 1 (10) through the ICC that is established by the RCC interconnect controller (9), wherein the inquiry command inquires of the SVC 1 (10) about which one or more storage spaces that are represented by one or more data storage addresses in the memory 1 (107) the read data (DATA-H') that is associated with the host read request, are to be read from (step 9005). After receiving the inquiry command, the SVC 1 (10) will confirm whether or not the memory 1 (107) has the read data (DATA-H') that is asked by the host read request (step 9007). If the determination result is "Yes" in step 9007, the process goes to the node G (step 9009). On the other hand, if the determination result is "No" in step 9007, the SVC 1 (10) will assign one or more storage spaces which correspond to one or more data storage addresses (for example, ADDR 1) of the buffer 1 (1071), for temporarily storing the read data (DATA-H') associated with the host read request (step 9011). Then the SVC 1 (10) will read the read data (DATA-H') from the LD 1 (12), temporarily store the read data (DATA-H') to the one or more data storage addresses (for example, ADDR 1) of the buffer (1071), and reply the one or more data storage addresses (for example, ADDR 1) to the SVC 2 (20) (step 9013).

When the CPC 2 (205) of the SVC 2 (20) receives, from the SVC 1 (20), the one or more data storage addresses (for example, ADDR 1) of the buffer 1 (1071), the CPC (2) (205) of the SVC 2 (20) will store the one or more data storage addresses (for example, ADDR 1) and inform the host-side I/O controller 2 (201) to read the read data (DATA-H') associated with the host read request, from the one or more data storage addresses (for example, ADDR 1) of the buffer 1 (1071) (step 9015). Afterwards, the SVC 2 (20) sends a message to the host (15) in order to notify the host (15) that the host (15) can receive the read data (DATA-H') (step 9017). Next, the process goes to the node H (step 9019), the subsequent steps of which are shown in FIG. 9B.

Please refer to FIG. 9B. Following above-mentioned step 9017, the process goes to step 9041 to step 9047 in FIG. 9B through the node H (step 9019), so as to execute the second part of the flowchart of the fourth embodiment shown in FIG. 9B. After the SVC 2 (20) informs the host (15) of receiving the read data (DATA-H'), the host-side I/O controller 2 (201) will read, through the ICC that is jointly established by the switch 2 (203), the RCC interconnect controller (9), and the switch 1 (103), the read data (DATA-H') from the one or more data storage addresses (for example, ADDR 1) of the buffer 1 (1071), and transmit the read data to the host (15) (step 9041). During the process of reading, the CPC 2 (205) of the SVC 2 (20) keeps checking and determining whether or not the read data (DATA-H') has been completely transmitted to the host (15) (step 9043) until it is determined that all the read data (DATA-H') has been completely transmitted to the host (15). Then, the process goes to the next step.

When step 9043 determines that all the read data (DATA-H') has been transmitted to the host (15), the CPC 2 (205) of the SVC 2 (20) will notify the host (15) of a message indicating the completion of the host read request previously issued by the host (15) (step 9045). On the other hand, the CPC 2 (205) of the SVC 2 (20) will also inform the CPC 1 (105) of the SVC 1 (10) that the read data (DATA-H') has been transmitted to the host (15) (step 9047).

On the other hand, when the determination result is "Yes" in step 9007 (that is to say, the memory 1 (107) has had the read data (DATA-H') asked by the host read request), the process goes to step 9035 to step 9047 in FIG. 9B through the node G (step 9009). In this case, the CPC 1 (105) of the SVC 1 (10) will notify the CPC 2 (205) of the SVC 2 (20) about the location where the read data (DATA-H')) is stored (i.e., the data storage addresses (for example, ADDR 1) in the memory 1 (107)) (step 9035). When the CPC 2 (205) of the SVC 2 (20) receives the notification from the CPC 1 (105) and thus knows the data storage addresses (for example, ADDR 1) where the read data (DATA-H') is stored in the memory 1 (107), the CPC 2 (205) will store the data storage addresses (for example, ADDR 1) and inform the host-side I/O controller 2 (201) to read the read data (DATA-H') from the data storage addresses (for example, ADDR 1) (step 9037). Then, the SVC 2 (20) will transmit a message to the host (15) to notify the host (15) that it can receive the read data (DATA-H') (step 9039).

When the SVC 2 (20) informs the host (15) that the host (15) can receive the read data (DATA-H'), the host-side I/O controller (201) will read, through the switch 2 (203), the ICC that is established by the RCC interconnect controller (9), and the switch 1 (103), the read data (DATA-H') from the one or more data storage addresses (for example, ADDR 1) of the memory 1 (107), and will transmit the read data (DATA-H') to the host (15) (step 9041). During the process of reading, the CPC 2 (205) of the SVC 2 (20) keeps checking and determining whether or not the read data (DATA-H') has been successfully read and transmitted to the host (15) (step 9043) until it is determined that the read data (DATA-H') has been successfully read and transmitted to the host (15). Then, the process goes to the next step.

When it is determined in step 9043 that all the read data (DATA-H') has been transmitted to the host (15), the CPC 2 (205) of the SVC 2 (20) will inform the host (15) that the host read request previously issued by the host (15) is completed (step 9045). On the other hand, the CPC 2 (205) of the SVC 2 (20) will also inform the CPC 1 (105) of the SVC 1 (10) that the read data (DATA-H') has already been transmitted to the host (15) (step 9047).

Please refer to FIG. 9A which takes the data storage system architecture (1) or (1a) as an example to illustrate the operating procedures from step 9001 to step 9003 and from step 9021 to step 9033 of the first part of the flowchart of the fourth embodiment of the present invention. When the host (15) intends to read a set of read data (DATA-H') from the LD 1 (12), the host (15) will issue a host read request (or a read I/O) to the RAID subsystem (3) or (3a). According to the present invention, the host read request may be issued to any one of the SVCs (10, 20) in the RAID subsystem (3) or (3a). In the following example, it is assumed that the owner of the LD 1 (12) is the SVC 1 (10). When one SVC (the SVC 1 (10) or the SVC (20)) in the RAID subsystem (3) or (3a) receives the host read request from the host (15) (step 9001), the receiving SVC (the SVC 1 (10) or the SVC 2 (20)) that receives the host read request will determine, through the information carried by the host read request, which one of the LDs (in this case, it is the LD 1 (12)) the host (15) intends to read the read data (DATA-H') from, and accordingly will know whether or not the receiving SVC itself has the ownership over the LD (i.e., the LD 1 (12)) (step 9003).

One determination result of above step 9003 may be that the host read request is received by the owner SVC (in this case, it is the SVC 1 (10) that receives the host read request); in other words, the SVC 1 (10) receives the host read request which asks to read a set of read data (DATA-H') from the LD 1 (12) managed by the SVC 1 (10) itself (step 9003). In this case, the SVC 1 (10) needs to determine whether or not its memory 1 (107) has the read data (DATA-H') associated with the host read request (step 9021). If the determination result is "No" in step 9021, the SVC 1 (10) will assign one or more storage spaces that are represented by one or more data storage addresses (for example, ADDR 1) of the buffer 1 (1071) for temporarily storing the read data (DATA-H') that is associated with the host write request (step 9023). Afterwards, the SVC 1 (10) will read the read data (DATA-H') from the LD 1 (12), and temporarily store the read data (DATA-H') to the one or more data storage addresses (for example, ADDR 1) of the buffer 1 (1071) (step 9025), and then the SVC 1 (10) will transmit a message to the host (15) to notify the host (15) that it can receive the read data (DATA-H') (step 9027).

When the SVC 1 (10) informs the host (15) of receiving the read data (DATA-H'), the host-side I/O controller 1 (101) will read, through the switch 1 (103), the read data (DATA-H') from the one or more data storage addresses (for example, ADDR 1) of the buffer 1 (1071) and transmit the read data to the host (15) (step 9029). During the process of reading, the CPC 1 (105) of the SVC 1 (10) keeps checking and determining whether or not the read data (DATA-H') has been successfully read and transmitted to the host (15) (9031) until it is determined that the read data (DATA-H') has been successfully read and transmitted to the host (15). Then, the CPC 1 (105) of the SVC 1 (10) will notify the host (15) that the host read request previously issued by the host (15) is completed (step 9033).

On the other hand, when the determination result is "Yes" in step 9021 (in other words, the memory 1 (107) has had the read data (DATA-H') to be read by the host read request), the CPC 1 (105) of the SVC 1 (10) will transmit a message to the host (15) in order to notify the host (15) that the read data (DATA-H') is ready to be sent to the host (15) (step 9027). Then, the host-side I/O controller 1 (101) of the SVC 1 (10) will read the read data (DATA-H') from the memory 1 (107) and transmit the read data to the host (15) (step 9029). During the process of reading, the CPC 1 (105) of the SVC 1 (10) keeps checking and determining whether or not the read data (DATA-H') has been successfully read and transmitted to the host (15) (step 9031) until it is determined that all the read data (DATA-H') has been successfully read and transmitted to the host (15). Then, the CPC 1 (105) of the SVC 1 (10) will notify the host (15) that the host read request previously issued by the host (15) is completed (step 9033).

Although a preferred embodiment of the invention has been disclosed for illustrative purposes, those skilled in the art will appreciate that many additions, modifications and substitutions are possible, without departing from the scope and spirit of the present invention as defined by the accompanying claims.

What is claimed is:

1. A method for accessing data in a data storage system architecture comprising a first storage virtualization controller (first SVC, SVC 1), a second storage virtualization controller (second SVC, SVC 2), and a storage pool, where the first SVC (SVC 1) comprises a first central processing circuitry (first CPC, CPC 1) and a first memory (memory 1), and the second SVC (SVC 2) comprises a second central processing circuitry (second CPC, CPC 2) and a second memory (memory 2), in which the first CPC (CPC 1) is coupled to the second CPC (CPC 2) through a transmission interface, and the first memory (memory 1) comprises a plurality of first storage spaces, and the second memory (memory 2) comprises a plurality of second storage spaces, the method comprising steps of:

managing, by the first SVC (SVC 1), a first logical drive (first LD, LD 1) in the storage pool;
receiving, by the second SVC (SVC 2), a write request from a host, where the write request intends to write a set of written data to the first LD (LD 1);
inquiring, by the second SVC (SVC 2), of the first SVC (SVC 1) about address information through the transmission interface;
transmitting, by the first SVC (SVC 1), the address information to the second SVC (SVC 2) through the transmission interface, where the address information comprises one or more first data storage addresses (ADDR 1) of the first memory (memory 1), which are located in the plurality of first storage spaces for storing the written data associated with the write request;
assigning, by the second SVC (SVC 2), one or more second data storage addresses (ADDR 2) in the second memory (memory 2), which correspond to the one or more first data storage addresses (ADDR 1), according to the received address information;
transmitting, by the second SVC (SVC 2), a message to the host in order to inform the host of starting to transmit the written data associated with the write request;
receiving, by the second SVC (SVC 2), the written data associated with the write request from the host;
writing, by the second SVC (SVC 2), the written data to the one or more second data storage addresses (ADDR 2) of the second memory (memory 2);
writing, by the second SVC (SVC 2), the written data to the one or more first data storage addresses (ADDR 1) of the first memory (memory 1) through the transmission interface; and
informing, by the second SVC (SVC 2), the host of completion of the write request.

2. The method according to claim 1, wherein the transmission interface is an inter-controller communications channel (ICC) that is established by a redundant controller communicating (RCC) interconnect controller.

3. The method according to claim 1, wherein the address information further comprises the one or more second data storage addresses (ADDR 2) in the second memory (memory 2).

4. The method according to claim 1, further comprising a step of: attaching, by the second SVC (SVC 2), the one or more second data storage addresses (ADDR 2) to the written data, when the second SVC (SVC 2) receives the written data from the host.

5. The method according to claim 4, wherein the step of receiving the written data from the host and the step of attaching the one or more second data storage addresses (ADDR 2) to the written data both are performed by a second host-side I/O device interconnect controller (second host-side I/O controller, or host-side I/O controller 2) of the second SVC (SVC 2).

6. The method according to claim 1, wherein the first SVC (SVC 1) is coupled to the transmission interface through a first switch (switch 1), and the second SVC (SVC 2) is coupled to the transmission interface through a second switch (switch 2).

7. The method according to claim 6, wherein the first switch (switch 1) and the second switch (switch 2) further comprise a non-transparent bridge (NTB) function.

8. The method according to claim 6, wherein the second SVC (SVC 2) stores, through the second switch (switch 2), the written data to the one or more second data storage addresses (ADDR 2) of the second memory (memory 2) and to the one or more first data storage addresses (ADDR 1) of the first memory (memory 1).

9. The method according to claim 1, further comprising steps of:

informing, by the second SVC (SVC 2), the first SVC (SVC 1) that the written data have been successfully written to the one or more first data storage addresses (ADDR 1) of the first memory (memory 1) and to the one or more second data storage addresses (ADDR 2) of the second memory (memory 2); and
transmitting, by the first SVC (SVC 1), a confirmation message to the second SVC (SVC 2) in order to inform the second SVC (SVC 2) that the written data have been successfully written to the one or more first data storage addresses (ADDR 1) of the first memory (memory 1).

10. The method according to claim 1, wherein the second SVC (SVC 2) further comprises a second multicast table (MT 2), and the second multicast table (MT 2) records one or more virtual multicast addresses (virtual multicast ADDR), and the one or more virtual multicast addresses (virtual multicast ADDR) correspond to the one or more first data storage addresses (ADDR 1) of the first memory (memory 1) and to the one or more second data storage addresses (ADDR 2) of the second memory (memory 2).

11. The method according to claim 10, further comprising a step of: attaching, by a second host-side I/O device interconnect controller (second host-side I/O controller, or host-side I/O controller 2) of the second SVC (SVC 2), the one or more virtual multicast addresses (virtual multicast ADDR) to the written data, when the second SVC (SVC 2) receives the written data from the host.

12. The method according to claim 11, wherein according to the one or more virtual multicast addresses (virtual multicast ADDR), a second switch (switch 2) of the second SVC (SVC 2) writes the written data to the one or more data storage addresses (ADDR 2) of the second memory (memory 2) and transmits the written data to the one or more data storage addresses (ADDR 1) Of the first memory (memory 1).

13. The method according to claim 10, wherein the second multicast table (MT 2) is stored in a second switch (switch 2) of the second SVC (SVC 2).

14. The method according to claim 1, wherein the plurality of second storage spaces are located in a second buffer (buffer 2) of the second memory (memory 2), and one or more reserved second storage spaces of the plurality of second storage spaces correspond to the one or more data storage addresses (ADDR 2).

15. The method according to claim 1, further comprising a step of: informing, by the second SVC (SVC 2), the first SVC (SVC 1) that the written data have already been written to the one or more first data storage addresses (ADDR 1) of the first memory (memory 1), where the one or more first data storage addresses (ADDR 1) are located in a first buffer (buffer 1) of the first memory (memory 1), while the one or more second data storage addresses (ADDR 2) are located in a second buffer (buffer 2) of the second memory (memory 2).

16. The method according to claim 1, further comprising a step of: storing, by the first SVC (SVC 1), the written data stored at the one or more first data storage addresses (ADDR 1) of the first memory (memory 1), to the first LD (LD 1).

17. The method according to claim 16, further comprising a step of: informing, by the first SVC (SVC 1), the second SVC (SVC 2) of completion of the write request, when the first SVC (SVC 1) stores the written data stored at the one or more first data storage addresses (ADDR 1) of the first memory (memory 1), to the first LD (LD 1).

18. The method according to claim 12, further comprising a step of: transmitting, by the first SVC (SVC 1), a confirmation message to the second SVC (SVC 2) in order to inform the second SVC (SVC 2) that the written data have been successfully written to the one or more first data storage addresses (ADDR 1) of the first memory (memory 1).

19. The method according to claim 10, wherein the second multicast table (MT 2) comprises a plurality of fields including a first field for recording the one or more virtual multicast addresses (virtual multicast ADDR), a second field for recording the one or more first data storage addresses (ADDR 1), and a third field for recording the one or more second data storage addresses (ADDR 2).

20. The method according to claim 10, wherein the first SVC (SVC 1) further comprises a first multicast table (MT 1) including a plurality of fields including a first field for recording the one or more virtual multicast addresses (virtual multicast ADDR), a second field for recording the one or more first data storage addresses (ADDR 1), and a third field for recording the one or more second data storage addresses (ADDR 2).

21. A method for accessing data in a data storage system architecture comprising a first storage virtualization controller (first SVC, SVC 1), a second storage virtualization controller (second SVC, SVC 2), and a storage pool, where the first SVC (SVC 1) comprises a first central processing circuitry (first CPC, CPC 1) and a first memory (memory 1), and the second SVC (SVC 2) comprises a second central processing circuitry (second CPC, CPC 2) and a second memory (memory 2), in which the first CPC (CPC 1) is coupled to the second CPC (CPC 2) through a transmission interface, and the first memory (memory 1) comprises a plurality of first storage spaces, and the second memory (memory 2) comprises a plurality of second storage spaces, the method comprising steps of:
managing, by the first SVC (SVC 1), a first logical drive (first LD, LD 1) in the storage pool;
receiving, by the second SVC (SVC 2), a read request from a host, where the read request intends to read a set of read data from the first LD (LD 1);
inquiring, by the second SVC (SVC 2), of the first SVC (SVC 1) about address information through the transmission interface;
transmitting, by the first SVC (SVC 1), the address information to the second SVC (SVC 2) through the transmission interface, where the address message comprises one or more first data storage addresses (ADDR 1) of the first memory (memory 1) which are located in the plurality of first storage spaces for storing the read data associated with the read request;
receiving and storing, by the second SVC (SVC 2), the address information;
transmitting, by the second SVC (SVC 2), a message to the host in order to inform the host of starting to receive the read data associated with the read request;
reading, by the second SVC (SVC 2), the read data from the one or more first data storage addresses (ADDR 1) of the first memory (memory 1) through the transmission interface; and
informing, by the second SVC (SVC 2), the host of completion of the read request.

22. The method according to claim 21, wherein the transmission interface is an inter-controller communications channel (ICC) that is established by a redundant controller communicating (RCC) interconnect controller.

23. The method according to claim 21, further comprising a step of: confirming, by the first SVC (SVC 1), whether or not, in the first memory (memory 1), there is the read data associated with the read request.

24. The method according to claim 21, further comprising steps of: reading, by the first SVC (SVC 1), the read data from the first LD (LD 1) and storing, by the first SVC (SVC 1), the read data to the one or more first data storage addresses (ADDR 1) of the first memory (memory 1).

25. The method according to claim 21, wherein the step of reading the read data from the one or more first data storage addresses (ADDR 1) of the first memory (memory 1) is performed by a second host-side I/O device interconnect controller (second host-side I/O controller, or host-side I/O controller 2) of the second SVC (SVC 2).

26. The method according to claim 21, wherein the first SVC (SVC 1) is coupled to the transmission interface through a first switch (switch 1), and the second SVC (SVC 2) is coupled to the transmission interface through a second switch (switch 2).

27. The method according to claim 26, wherein the first switch (switch 1) and the second switch (switch 2) further comprise a non-transparent bridge (NTB) function.

28. The method according to claim 21, further comprising a step of: informing, by the second SVC (SVC 2), the first SVC (SVC 1) that the read data has been transmitted to the host.

29. A data storage system architecture, comprising:
a storage pool comprising a first logical drive (first LD, LD 1), where the first LD (LD 1) is formed by mapping one or more physical storage devices (PSDs);
a first storage virtualization controller (first SVC, SVC 1) comprising a first central processing circuitry (first CPC, CPC 1), a first memory (memory 1), where the first CPC (CPC 1) is used to manage the first LD (LD 1) and to present the first LD (LD 1) to a host, and the first memory (memory 1) comprises a plurality of first storage spaces; and
a second storage virtualization controller (second SVC, SVC 2) comprising a second central processing circuitry (second CPC, CPC 2), a second memory (memory 2), where the second CPC (CPC 2) is coupled to the first CPC (CPC 1) through a transmission interface, and the second memory (memory 2) comprises a plurality of second storage spaces;
wherein when the second SVC (SVC 2) receives an input/output request (I/O request) from the host to access the first LD (LD 1), the second CPC (CPC 2) of the second SVC (SVC 2) inquires of the first SVC (SVC 1) about address information;
wherein the first SVC (SVC 1) transmits the address information to the second SVC (SVC 2) through the transmission interface, and the address information comprises one or more first data storage addresses (ADDR 1) of the first memory (memory 1); and
wherein the second SVC (SVC 2) executes the I/O request according to the one or more first data storage addresses (ADDR 1).

30. The data storage system architecture according to claim 29, wherein the first memory (memory 1) further comprises a first buffer (buffer 1) for providing one or more reserved first storage spaces that correspond to the one or more first data storage addresses (ADDR 1), while the second memory (memory 2) further comprises a second buffer (buffer 2) for providing one or more reserved second storage spaces that correspond to one or more second data storage addresses (ADDR 2).

31. The data storage system architecture according to claim 29, wherein the first SVC (SVC 1) further comprises a first host-side I/O device interconnect controller (first host-side I/O controller, host-side I/O controller 1) to be used as a transmission interface between the first SVC (SVC 1) and the host, while the second SVC (SVC 2) further comprises a second host-side I/O device interconnect controller (second host-side I/O controller, host-side I/O controller 2) to be used as a transmission interface between the second SVC (SVC 2) and the host.

32. The data storage system architecture according to claim 31, wherein the first SVC (SVC 1) further comprises a first switch (switch 1) having a non-transparent bridge (NTB) function that is internally coupled to the first CPC (CPC 1) and to the first host-side I/O controller (host-side I/O controller 1), and that is externally coupled to the second SVC (SVC 2) through the transmission interface, while the second SVC (SVC 2) further comprises a second switch (switch 2) having a non-transparent bridge (NTB) function that is internally coupled to the second CPC (CPC 2) and to the second host-side I/O controller (host-side I/O controller 2), and that is externally coupled to the first SVC (SVC 1) through the transmission interface.

33. The data storage system architecture according to claim 32, wherein the first CPC (CPC 1) and the first switch (switch 1) are integrated on a single chip or are independent circuit modules, while the second CPC (CPC 2) and the second switch (switch 2) are integrated on a single chip or are independent circuit modules.

34. The data storage system architecture according to claim 32, wherein the first host-side I/O device interconnect controller (host-side I/O controller 1) and the first switch (switch 1) are integrated on a single chip or are independent circuit modules, while the second host-side I/O device interconnect controller (host-side I/O controller 2) and the second switch (switch 2) are integrated on a single chip or are independent circuit modules.

35. The data storage system architecture according to claim 32, wherein the first host-side I/O controller (host-side I/O controller 1) and the first CPC (CPC 1) are integrated on a single chip or are independent circuit modules, while the second host-side I/O controller (host-side I/O controller 2) and the second CPC (CPC 2) are integrated on a single chip or are independent circuit modules.

36. The data storage system architecture according to claim 29, wherein the transmission interface is an inter-controller communications channel (ICC) that is established by a redundant controller communicating (RCC) interconnect controller.

37. The data storage system architecture according to claim 29, wherein when the I/O request is a write request, the second SVC (SVC 2) assigns, according to the received address information, one or more second data storage addresses (ADDR 2) of the second memory (memory 2), which correspond to the one or more first data storage addresses (ADDR 1), or refers to a second multicast table (MT 2) in order to obtain one or more virtual multicast addresses (virtual multicast ADDR) which correspond to the one or more first data storage addresses (ADDR 1).

38. The data storage system architecture according to claim 37, wherein the second SVC (SVC 2) further comprises a second host-side I/O device interconnect controller (second host-side I/O controller, host-side I/O controller 2) and a second switch (switch 2), where the second host-side I/O controller (host-side I/O controller 2) is used to receive written data associated with the write request from the host, used to attach the one or more second data storage addresses (ADDR 2) or the one or more virtual multicast addresses (virtual multicast ADDR) to the written data, and used to transmit the written data attached with the one or more second data storage addresses (ADDR 2) or attached with the one or more virtual multicast addresses (virtual multicast ADDR), to the second switch (switch 2).

39. The data storage system architecture according to claim 38, wherein after the second switch (switch 2) receives the written data, the second switch (switch 2) stores the written data to the one or more second data storage addresses (ADDR 2) of the second memory (memory 2), and the second switch (switch 2) stores, through the transmission interface, the written data to the one or more first data storage addresses (ADDR 1) of the first memory (memory 1).

40. The data storage system architecture according to claim 38, wherein after the second switch (switch 2) receives the written data, the second switch (switch 2) looks up a second multicast table (MT 2) according to the one or more virtual multicast addresses (virtual multicast ADDR) that is attached to the written data, in order to obtain the one or more first data storage addresses (ADDR 1) and the one or more second data storage addresses (ADDR 2), both of which correspond to the one or more virtual multicast addresses (virtual multicast ADDR), so that the second switch (switch 2) performs a multicast operation to write the written data to the second memory (memory 2) according to the one or more second data storage addresses (ADDR 2) and to the first memory (memory 1) according to the one or more first data storage addresses (ADDR 1).

41. The data storage system architecture according to claim 29, wherein when the I/O request is a read request, the second SVC (SVC 2) reads, through the transmission interface, a set of read data from the one or more first data storage addresses (ADDR 1) of the first memory (memory 1), according to the address information.

* * * * *